US007603349B1

(12) United States Patent
Kraft et al.

(10) Patent No.: US 7,603,349 B1
(45) Date of Patent: Oct. 13, 2009

(54) USER INTERFACES FOR SEARCH SYSTEMS USING IN-LINE CONTEXTUAL QUERIES

(75) Inventors: Reiner Kraft, Gilroy, CA (US); Andreas Hartmann, San Francisco, CA (US); Paulien Strijland, Menlo Park, CA (US)

(73) Assignee: Yahoo! Inc., Sunnyvale, CA (US)

(*) Notice: Subject to any disclaimer, the term of this patent is extended or adjusted under 35 U.S.C. 154(b) by 277 days.

(21) Appl. No.: 11/033,417

(22) Filed: Jan. 10, 2005

Related U.S. Application Data

(63) Continuation-in-part of application No. 10/903,283, filed on Jul. 29, 2004.

(51) Int. Cl.
*G06F 7/00* (2006.01)

(52) U.S. Cl. .................................... 707/5; 707/3; 707/4

(58) Field of Classification Search ..................... 707/5, 707/3, 4
See application file for complete search history.

(56) References Cited

U.S. PATENT DOCUMENTS

| | | | | |
|---|---|---|---|---|
| 5,048,099 | A | 9/1991 | Lee | |
| 5,070,478 | A | 12/1991 | Abbott | |
| 5,517,586 | A | 5/1996 | Knowlton | |
| 5,574,840 | A | 11/1996 | Kwatinetz et al. | |
| 5,619,709 | A | 4/1997 | Caid et al. | |
| 5,712,656 | A | 1/1998 | Ikeda et al. | |
| 5,714,983 | A | 2/1998 | Sacks | |
| 5,771,378 | A | 6/1998 | Holt et al. | |
| 6,134,532 | A | 10/2000 | Lazarus et al. | |
| 6,169,992 | B1 * | 1/2001 | Beall et al. | 707/103 R |
| 6,240,430 | B1 | 5/2001 | Deike et al. | |
| 6,327,590 | B1 | 12/2001 | Chidlovskii et al. | |
| 6,446,065 | B1 * | 9/2002 | Nishioka et al. | 707/5 |
| 6,633,868 | B1 | 10/2003 | Min et al. | |
| 6,640,010 | B2 | 10/2003 | Seeger et al. | |
| 6,683,631 | B2 | 1/2004 | Carroll | |
| 6,701,311 | B2 * | 3/2004 | Biebesheimer et al. | 707/5 |
| 6,785,670 | B1 * | 8/2004 | Chiang et al. | 707/3 |
| 6,789,073 | B1 | 9/2004 | Lunenfeld | |
| 6,891,551 | B2 | 5/2005 | Keely et al. | |
| 6,961,731 | B2 * | 11/2005 | Holbrook | 707/102 |
| 7,058,626 | B1 | 6/2006 | Pan et al. | |
| 7,139,445 | B2 | 11/2006 | Pilu et al. | |
| 2001/0037205 | A1 | 11/2001 | Joao | |

(Continued)

OTHER PUBLICATIONS

Krishna Bharat, "SearchPad: explicit capture of search context to support web search", Computer Networks vol. 33—issues 1-6, Jun. 2000, pp. 493-501.*

(Continued)

*Primary Examiner*—Shahid A Alam
*Assistant Examiner*—Thu-Nguyet Le
(74) *Attorney, Agent, or Firm*—Hickman Palermo Truong & Becker LLP

(57) ABSTRACT

Systems and methods, including user interfaces, are provided for implementing searches using contextual information associated with a Web page (or other document) that a user is viewing when a query is entered. The page includes a contextual search interface that has an associated context vector representing content of the page. When the user submits a search query via the contextual search interface, the query and the context vector are both provided to the query processor and used in responding to the query.

25 Claims, 20 Drawing Sheets

U.S. PATENT DOCUMENTS

| | | | | |
|---|---|---|---|---|
| 2002/0004735 | A1 | 1/2002 | Gross | |
| 2002/0072997 | A1 | 6/2002 | Colson et al. | |
| 2002/0092019 | A1 | 7/2002 | Marcus | |
| 2002/0105532 | A1 | 8/2002 | Oblinger | |
| 2003/0097357 | A1* | 5/2003 | Ferrari et al. | 707/3 |
| 2003/0135582 | A1 | 7/2003 | Allen et al. | |
| 2003/0204530 | A1 | 10/2003 | Anderson et al. | |
| 2003/0229893 | A1 | 12/2003 | Sgaraglino | |
| 2003/0233224 | A1 | 12/2003 | Marchisio et al. | |
| 2004/0002959 | A1 | 1/2004 | Alpert et al. | |
| 2004/0117358 | A1* | 6/2004 | von Kaenel et al. | 707/3 |
| 2004/0133471 | A1 | 7/2004 | Pisaris-Henderson et al. | |
| 2004/0240735 | A1 | 12/2004 | Medina | |
| 2005/0080780 | A1 | 4/2005 | Colledge et al. | |
| 2005/0160080 | A1* | 7/2005 | Dawson | 707/3 |
| 2006/0026013 | A1 | 2/2006 | Kraft | 705/1 |
| 2006/0036570 | A1 | 2/2006 | Schaefer et al. | |
| 2006/0074853 | A1 | 4/2006 | Liu et al. | |
| 2006/0074876 | A1 | 4/2006 | Kakivaya et al. | |
| 2006/0242018 | A1 | 10/2006 | Shulman et al. | |
| 2007/0106657 | A1 | 5/2007 | Brzeski et al. | |

OTHER PUBLICATIONS

Current Claims for International Application No. PCT/US05/26184, pp. 1-8.

ISA/US Patent Cooperation Treaty, PCT "Notification of Transmittal of the International Search Report and the Written Opinion of the International Searching Authority, or the Declaration", PCT/US05/26184 dated July 31, 2007, pp. 1-9.

U.S. Appl. No. 10/903,283, filed Jul. 29, 2004.

Almieda, B et al., "A Community-Aware Search Engine" WWW2004 (2004) pp. 413-421.

Bharat, K. "SearchPad: explicit capture of search context to support Web search" Conference Proceedings, 9th International World Wide Web Conference (2000) pp. 493-501.

Budzik, J. et al., "User Interactions with Everyday Applications as Context for Just-in-time Information Access" ACM (2000) pp. 44-51.

Finkelstein, L. et al., "Placing Search in Context: The Concept Revisited" WWW10 (2001), 13 pages.

Freyne, J. et al., "Further Experiments on Collaborative Ranking in Community-Based Web Search" Artificial Intelligence Review (2004) pp. 229-252.

Lieberman, H., "Letizia: An Agent That Assists Web Browsing" IJCAI-95 Proceedings of the Fourteenth International Joint Conference on Artificial Intelligence (1995) pp. 924-929.

Mitra, M. et al., "Improving Automatic Query Expansion" ACM (1998) Pages 206-214.

Rhodes, B. et al., "Remembrance Agent: A continuously running automated information retrieval system" The Proceedings of The First International Conference on The Practical Application Of Intelligent Agents and Multi Agent Technology (1996) 7 pages.

Manifold, "Selection", dated Dec. 24, 2003, 37 pages.

Zhao, Hongkun, et al., "Fullyautomatic wrapper generation for search engines", International World Wide Web Conference, Proceedings of the 14$^{th}$ International conference on World wide web, ACM 2005, 10 pages.

Gibbins, Nicholas, et al., "Agent-based semantic web services", International World wide web conference, Proceedings of the 12$^{th}$ International conference World wide web, ACM 2003, 8 pages.

Budzik, et al., "Anticipating Information Needs: Everyday Applications as Interfaces to Internet Information Resources", Proceedings of the 1998 World Conference of the WWW, AACE Press, 1998, 8 pages.

Budzik, et al., "User interactions with Everyday Applications as Context for Just-in-time Information Access", Proceedings of the 2000 International Conference on Intelligent User Interfaces, ACM Press, 2000, 7 pages.

Budzik, et al., "Information Access in Context", Knowledge Based Systems, Sep. 2001, 17 pages.

Budzik, et al., "Supporting on-line resource discovery in the context of ongoing tasks with proactive software assistants", International Journal of Human-Computer Studies, Jan. 2002, 27 pages.

Budzik, et al., "Anticipating and Contextualizing Information Needs", In Proceedings of the Sixty Second Annual Meeting of the American Society for Information Science, Learned Information Inc., 1999, 13 pages.

Sugiyama, Kazunari et al., "Adaptive Web search based on user profile constructed without any effort from users", XP-002434325, International World Wide Web Conference, XX, XX, May 2004, 10 pages.

European Patent Office, "Supplementary European Search Report", application No. EP 05774749, dated Mar. 31, 2009, 7 pages.

Claims, application No. EP 05774749, 9 pages.

* cited by examiner

400

| 402 | 404 | 406 | 408 | 410 |
|---|---|---|---|---|
| cabrio | 11 | 1 | 0.0153846153846 | TEXT |
| golf | 6 | 1 | 0.0153846153846 | TEXT |
| vw | 3 | 1 | 0.0153846153846 | TEXT |
| like | 2 | 1 | 0.0153846153846 | TEXT |
| followed | 2 | 1 | 0.0153846153846 | TEXT |
| production | 2 | 1 | 0.0153846153846 | TEXT |
| 1 | 2 | 1 | 0.0153846153846 | TEXT |
| now | 2 | 1 | 0.0153846153846 | TEXT |
| scirocco | 2 | 1 | 0.0153846153846 | TEXT |
| type | 2 | 1 | 0.0153846153846 | TEXT |

← 600

Entertainment

Bono Denies Plans for a 'Live Aid 2' Concert
Reuters - Tue Jun 1, 10:16 AM ET
Irish rock star Bono played down rumors on Tuesday that he and his friends in the music industry are planning a second Live Aid concert to raise money to fight AIDS.

Q· Search This
↑
612

Entertainment Section
- Reuters
- AP
- AFP   602
- E! Online
- Variety
- USATODAY.com
- ET on Yahoo!
- CP
- Photos

Sports

Williams Sisters Lose at French Open
AP - 37 minutes ago
Venus Williams again came up short in a bid for her first Grand Slam title since 2001, losing to Anastasia Myskina 6-3, 6-4 Tuesday in the Roland Garros quarterfinals.

Q· Search This
↑
614

Sports Section
- AP
- Reuters   604
- USATODAY.com
- New York Post
- AFP
- CP

Technology

PluggedIn: Sun Powers Gadgets on Peaks, in Valleys
Reuters - 50 minutes ago
Gadget lovers are using solar panels to power their toys in the remotest places -- like Mt. Everest, altitude 29,029 feet.
Q· Search This
↑
616

Technology Section
- Reuters
- AP   606
- washingtonpost.com
- USATODAY.com
- NewsFactor
- PC World
- AFP
- SiliconValley.com
- Ziff Davis
- CP

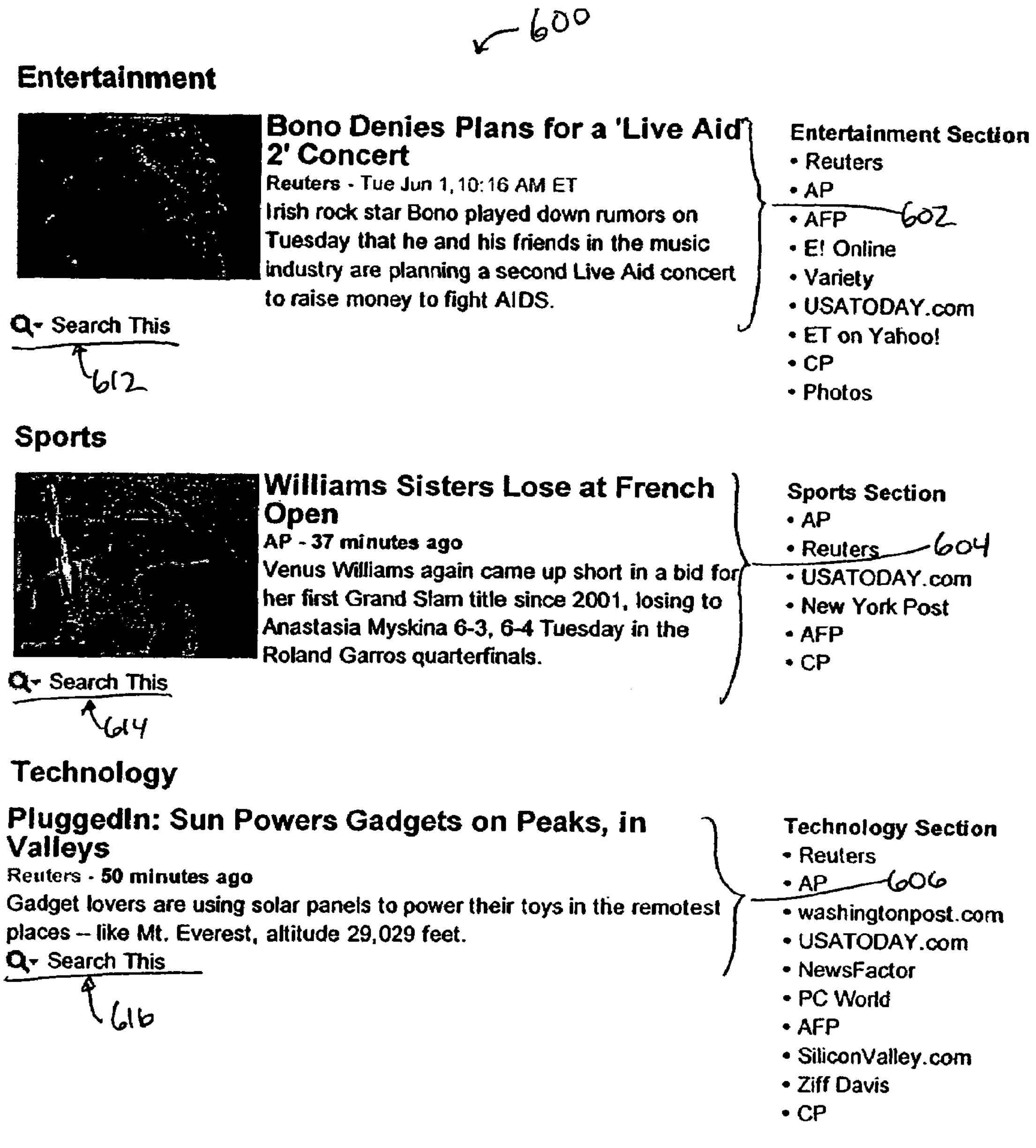

FIG. 6

Entertainment

←600'

Bono Denies Plans for a 'Live Aid 2' Concert
Reuters - Tue Jun 1, 10:16 AM ET
Irish rock star Bono played down rumors on Tuesday that he and his friends in the music industry are planning a second Live Aid concert to raise money to fight AIDS.

Entertainment Section
- Reuters
- AP
- AFP  —602
- E! Online
- Variety
- USATODAY.com
- ET on Yahoo!
- CP
- Photos ✖ Search This  /1404
[                    ] (Search) —1406

Shop in Context:

(What's this?) (Become a Sponsor)

- Bono - $12.69  Make Overstock.com your one-stop-shop for all your media needs. Find the latest book, movie, music and gaming titles at deep discounts. Flat-rate shipping. Overstock - your online outlet.
  www.overstock.com
- Bono and U2 Items on eBay  Bono and U2 items and more, now for sale on eBay. Find millions of products at low prices - all on eBay, the World's Online Marketplace.
  www.ebay.com 1402                                               1408

Sports

Williams Sisters Lose at French Open
AP - 37 minutes ago
Venus Williams again came up short in a bid for her first Grand Slam title since 2001, losing to Anastasia Myskina 6-3, 6-4 Tuesday in the Roland Garros quarterfinals.

Sports Section
- AP
- Reuters
- USATODAY.com
- New York Post
- AFP     604
- CP

✖ Search This  /1414
[                    ] (Search) —1416

Shop in Context:

1412

(What's this?) (Become a Sponsor)

- Buy Serena & Venus Williams Posters  Shop for 1,000's of sports posters at Art.com. We've got posters of all your favorite teams and sports stars. Art.com is your one-stop super store for posters and framing.
  www.art.com
- Rent Venus Williams DVDs - Free Trial  Netflix: Rent as many DVDs as you want for just $22/month. Over 20,000 titles, choose from classics to new releases. No late fees ever. Free shipping both ways.
  www.netflix.com

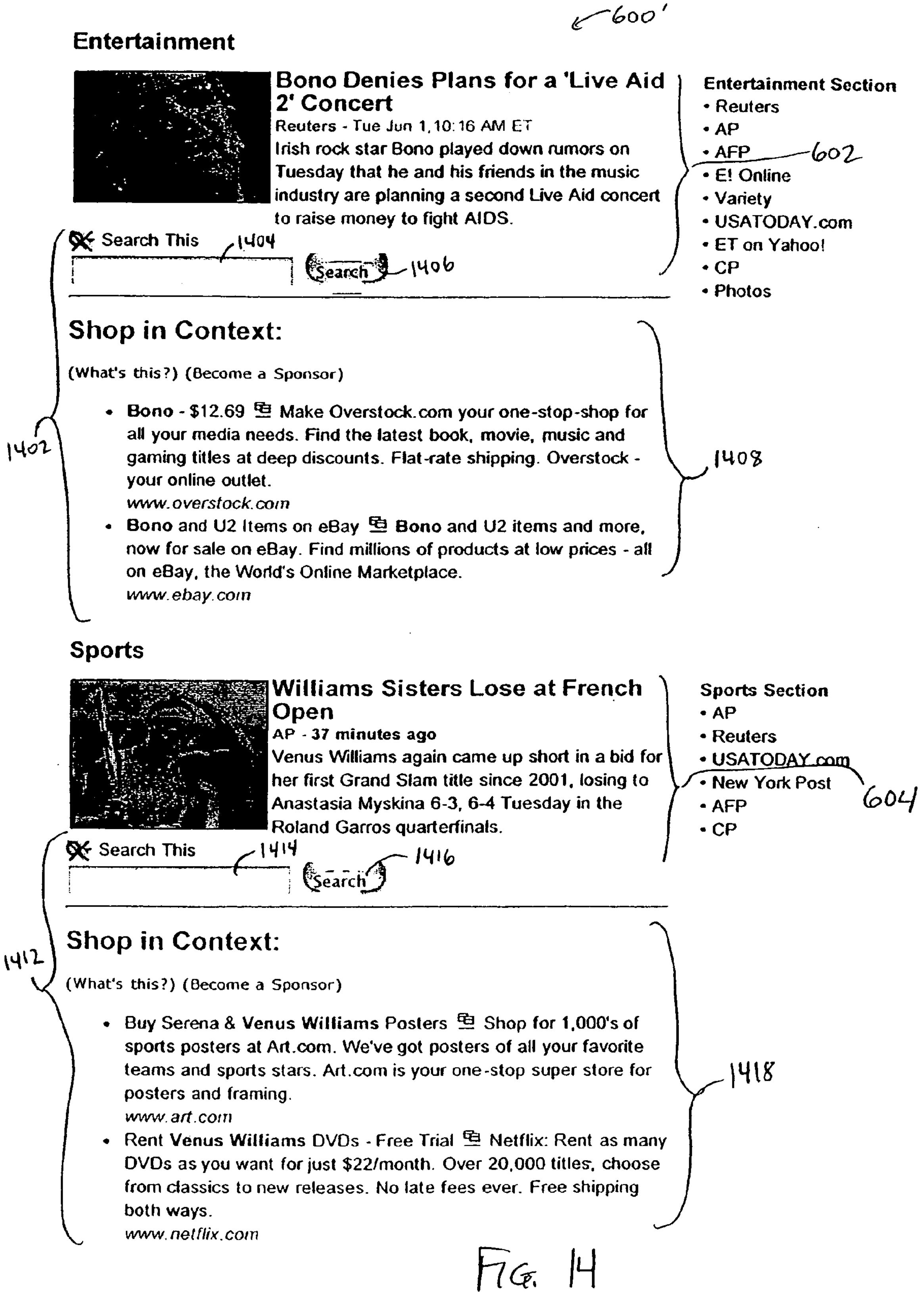

FIG. 14

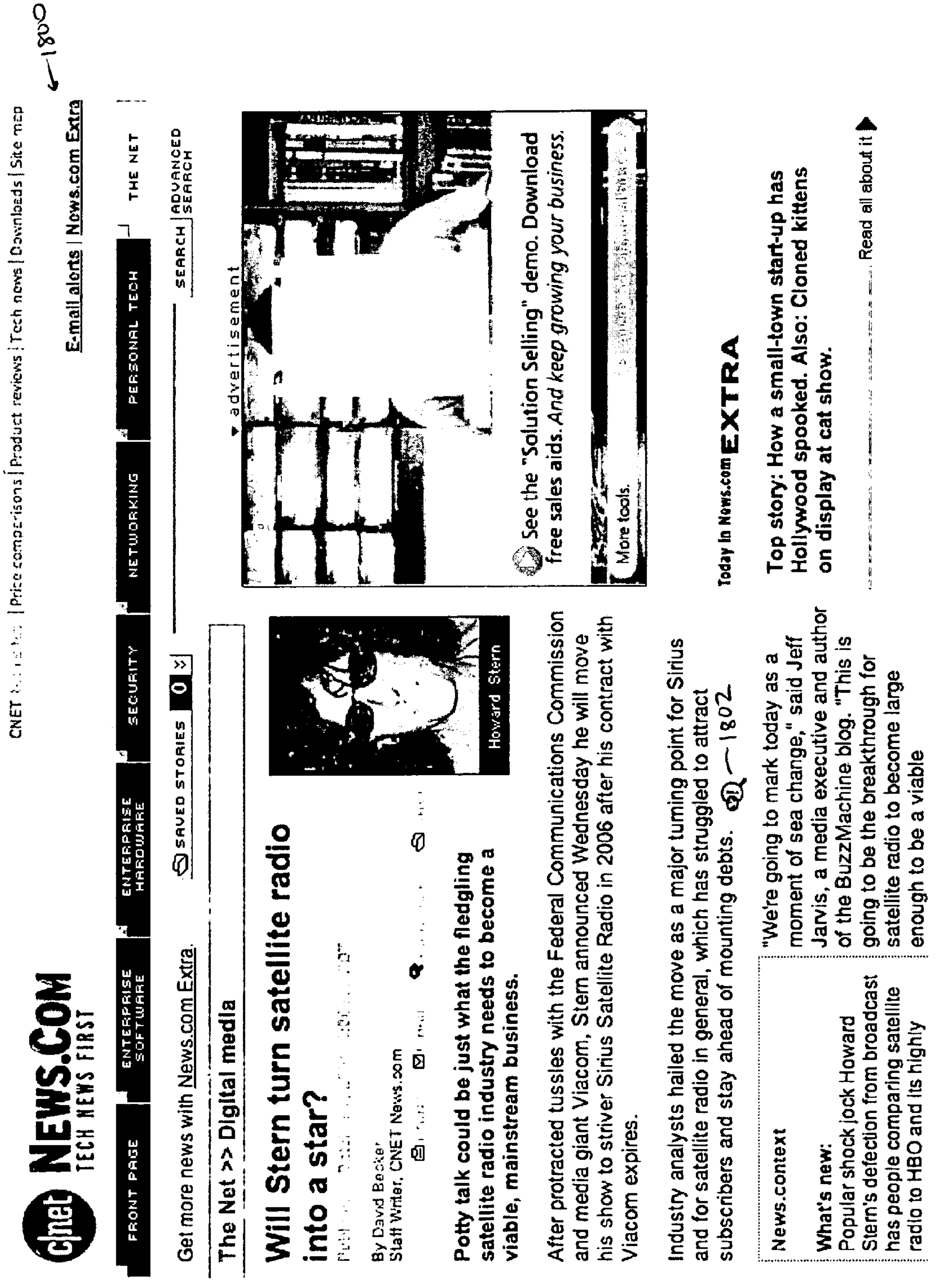

FIG. 18A

[Screenshot of CNET News.com webpage — 1800]

CNET [...] | Price comparisons | Product reviews | Tech news | Downloads | Site map E-mail alerts | News.com Extra

News.COM
TECH NEWS FIRST

FRONT PAGE | ENTERPRISE SOFTWARE | ENTERPRISE HARDWARE | SECURITY | NETWORKING | PERSONAL TECH | THE NET

SAVED STORIES

SEARCH | ADVANCED SEARCH

Get more news with News.com Extra.

The Net >> Digital media

Will Stern turn satellite radio into a star?

By David Becker
Staff Writer, CNET News.com

Howard Stern

Potty talk could be just what the fledgling satellite radio industry needs to become a viable, mainstream business.

After protracted tussles with the Federal Communications Commission and media giant Viacom, Stern announced Wednesday he will move his show to striver Sirius Satellite Radio in 2006 after his contract with Viacom expires.

Industry analysts hailed the move as a major turning point for Sirius and for satellite radio in general, which has struggled to attract subscribers and stay ahead of mounting debts. — 1802

"We're going to mark today as a moment of sea change," said Jeff Jarvis, a media executive and author of the BuzzMachine blog. "This is going to be the breakthrough for satellite radio to become large enough to be a viable News.context What's new:
Popular shock jock Howard Stern's defection from broadcast has people comparing satellite radio to HBO and its highly ▼ advertisement See the "Solution Selling" demo. Download free sales aids. And keep growing your business.

More tools.

Today in News.com EXTRA

Top story: How a small-town start-up has Hollywood spooked. Also: Cloned kittens on display at cat show.

Read all about it ▶

Yahoo! My Yahoo! Mail    Welcome, Guest [Sign In]

Search Home   Help

YAHOO! search  Web | Images | Directory | Yellow Pages | News | Products

[athens] — 2004

Search — 2006

Shortcuts   Advanced Search   Preferences

[ turn this off ] — 2016 powered by hp

Search Results   Results 1 - 20 of about 3,200,000 for athens olympics. Search took 0.12 seconds. (About this page...)

2008 — These results were automagically refined by: http://story.news.yahoo.com/...olympic_games — 2010

☑ 2004 games, ☑ olympics, ☑ greece, ☑ accommodation, ☑ schedule, ☑ tourism, ☑ events, ☑ security 2014  2012  2014  2012

Also try: athens beijing, athens olympic fire, athens olympic history

INSIDE YAHOO!
Olympics: Coverage of the Olympics on Yahoo! Sports
News: Olympic weightlifting reels as six more lifters fail drug tests AFP - 13 minutes ago
Thursday's Olympic Capsules AP - 27 minutes ago
More Olympics Headlines | Full Coverage on Olympics

1. Athens 2004 Summer Olympic Games
   official site of the 2004 Olympic Games. Includes news, schedules, and results.
   Category: 2004 Olympic Games - Athens
   www.athens2004.com/ - 49k - Cached - More like this 2. International Olympic Committee: Athens 2004
   provides general facts and figures, photo gallery, and news.
   Category: 2004 Olympic Games - Athens
   www.olympic.org/uk/games/athens/index_uk.asp - 29k - Cached - More like this

2000 ↗

2002

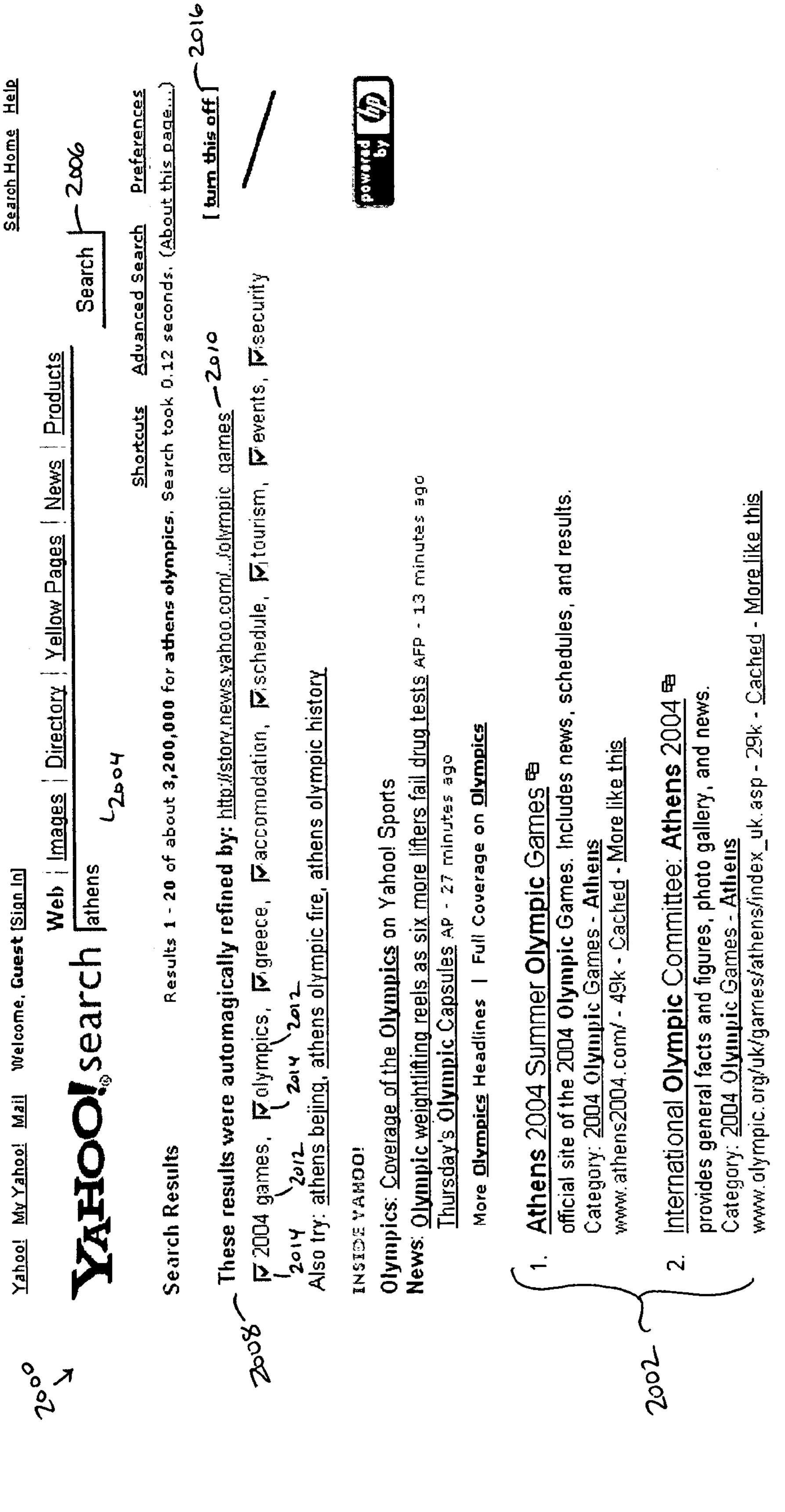

FIG. 20

USER INTERFACES FOR SEARCH SYSTEMS USING IN-LINE CONTEXTUAL QUERIES

CROSS-REFERENCES TO RELATED APPLICATIONS

This application is a continuation-in-part of application Ser. No. 10/903,283, filed Jul. 29, 2004, entitled "Search Systems and Methods Using In-Line Contextual Queries," the disclosure of which is incorporated herein by reference for all purposes.

The present disclosure is related to the following commonly-assigned co-pending U.S. Patent Applications:

Application Ser. No. 11/033,100, filed Jan. 10, 2005, entitled "Search Systems and Methods Using Enhanced Contextual Queries"; and Application Ser. No. 11/033,101, filed Jan. 10, 2005, entitled "User Interface for Text Selection".

The respective disclosures of these applications are incorporated herein by reference for all purposes.

BACKGROUND OF THE INVENTION

The present invention relates in general to search systems and methods and in particular to search systems and methods using in-line contextual queries.

The World Wide Web (Web), as its name suggests, is a decentralized global collection of interlinked information—generally in the form of "pages" that may contain text, images, and/or media content—related to virtually every topic imaginable. A user who knows or finds a uniform resource locator (URL) for a page can provide that URL to a Web client (generally referred to as a browser) and view the page almost instantly. Since Web pages typically include links (also referred to as "hyperlinks") to other pages, finding URLs is generally not difficult.

What is difficult for most users is finding URLs for pages that are of interest to them. The sheer volume of content available on the Web has turned the task of finding a page relevant to a particular interest into what may be the ultimate needle-in-a-haystack problem. To address this problem, an industry of search providers (e.g., Yahoo!, MSN, Google) has evolved. A search provider typically maintains a database of Web pages in which the URL of each page is associated with information (e.g., keywords, category data, etc.) reflecting its content. The search provider also maintains a search server that hosts a search page (or site) on the Web. The search page provides a form into which a user can enter a query that usually includes one or more terms indicative of the user's interest. Once a query is entered, the search server accesses the database and generates a list of "hits," typically URLs for pages whose content matches keywords derived from the user's query. This list is provided to the user. Since queries can often return hundreds, thousands, or in some cases millions of hits, search providers have developed sophisticated algorithms for ranking the hits (i.e., determining an order for displaying hits to the user) such that the pages most relevant to a given query are likely to appear near the top of the list. Typical ranking algorithms take into account not only the keywords and their frequency of occurrence but also other information such as the number of other pages that link to the hit page, popularity of the hit page among users, and so on.

To further facilitate use of their services, some search providers now offer "search toolbar" add-ons for Web browser programs. A search toolbar typically provides a text box into which the user can type a query and a "Submit" button for submitting the query to the search provider's server. Once installed by the user, the search toolbar is generally visible no matter what page the user is viewing, enabling the user to enter a query at any time without first navigating to the search provider's Web site. Searches initiated via the toolbar are processed in the same way as searches initiated at the provider's site; the only difference is that the user is spared the step of navigating to the search provider's site.

While automated search technologies can be very helpful, they do have a number of limitations, a primary one being that users struggle to convey enough contextual information to direct the search to relevant content. An overly broad query (too little context) can return a few needles of relevant content buried in a haystack of irrelevant hits; an overly narrow query (too much context) may result in filtering out the needles along with the hay. Often a user has a fairly specific context in mind, but this specific context may not be reflected in a query. For example, a user who enters the query "jaguar" might be thinking of the automobile, the animal, the professional football team, or something else entirely.

In principle, contextual information might be gleaned from what the user was doing prior to entering the query. It is well known that users are often inspired to conduct searches when information they are currently reviewing raises a further question. For example, a user who enters the query "jaguar" after (or while) viewing an automobile-related page is most likely interested in the automobile while one who enters the same query after (or while) viewing a page about zoos is most likely interested in the animal. Existing search technologies do not provide reliable ways of gathering such contextual information or using it to respond to a query.

Therefore, it would be desirable to provide a search server with contextual information that is usable for responding to queries.

BRIEF SUMMARY OF THE INVENTION

Embodiments of the present invention provide systems and methods for implementing searches using contextual information associated with a page or other document that a user is viewing when a query is entered. In some embodiments, the page or document includes a contextual search interface that has an associated context vector representing content of the page or document. When the user submits a search query via the contextual search interface, the context vector is also provided to the query processor and used in responding to the query. Context vectors may also be used in other ways, such as selecting additional content that may be of interest to a user.

According to one aspect of the present invention, a method for performing a search is provided. A user interface is provided, the user interface including: a selection control element operable while a user is viewing a page containing content, the selection control element configured to enable the user to select at least a portion of the content as a search context; and a query entry area configured to accept entry of query terms by a user. Via the user interface, a selected search context and one or more query terms are received. The one or more query terms and a representation of the selected search context are transmitted to a search engine configured to execute a search based on the one or more keywords and the selected search context. A search result is received from the search engine, and displaying the search result is displayed to the user.

In some embodiments, displaying the search result to the user includes displaying a user editable list of context terms derived from the representation of the selected search context. A user update to the user editable list of context terms may be received, and the user update may be transmitted to the search engine, which may be further configured to execute a modified search based on the user updated context terms and the one or more query terms.

In some embodiments, the selection control element is configured such that the user selects an anchor point by clicking on a location within the page and expands a selected region around the anchor point by subsequently clicking one or more times further. For instance, the selected region may be expanded radially outward from the anchor point for each subsequent click, or the selected region may be expanded outward from the anchor point in semantic increments (e.g., a sentence or paragraph) for each subsequent click.

According to another aspect of the present invention, a method for performing a search is provided. A page containing content is displayed, with the page further including one or more contextual search icons, each contextual search icon being associated with a portion of the content of the page. A user selection of one of the one or more contextual search icons is received. In response to the user selection, an expanded contextual search interface corresponding to the selected contextual search icon is displayed, the expanded contextual search interface including a query entry area configured to accept entry of one or more query terms by a user. A query is received from the user via the query entry area. The query and a representation of the associated portion of the content are transmitted to a search engine configured to execute a search based on the one or more query terms and the representation. A search result is received from the search engine, and the search result is displayed to the user.

In some embodiments, displaying the expanded contextual search interface includes displaying the query entry area as an element of the page. In other embodiments, displaying the expanded contextual search interface includes displaying a pop up element containing the query entry area.

In some embodiments, the expanded contextual search interface may also include augmented content, such as one or more of: a suggestion for a related search, the suggestion determined based at least in part on the representation of the associated portion of the content; a link to a related page, the related page being selected based at least in part on the representation of the associated portion of the content; a search result for a search query generated based at least in part on the representation of the associated portion of the content.

According to yet another aspect of the present invention, method for performing a search is provided. A user interface is provided, the interface including a query field and a context field. Via the user interface, one or more query terms entered by the user in the query field and context data entered by the user in the context field are received. The query terms and a representation of the context data are transmitted to a search engine configured to execute a search based on the query terms and the representation of the context data. A search result is received from the search engine, and the search result is displayed to the user.

According to a further aspect of the present invention, a graphical user interface for a search engine includes a selection control element, a query entry area, and a submission control element. The selection control element, which is operable while a user is viewing a page containing content, is configured to enable the user to select at least a portion of the content as a search context. The query entry area is configured to accept entry of one or more query terms by a user. The submission control element is configured to submit a query including any query terms entered in the query entry area and a representation of the selected search context to the search engine in response to user operation of the submission control element. In response to submission of the query, the search engine executes a contextual search operation using the entered query terms and the representation of the selected search context and returns a result of the contextual search operation to the user.

In some embodiments, the graphical user interface appears in line in the page containing content. For example, the page may initially display an icon corresponding to the selection control element, and the query entry area and the submission control element may be displayed (e.g., in line in the page or in a pop-up element) in response to selection of the icon by the user. The pop-up element may be further configured to display additional information together with the query entry area, such as: a link to a page containing content related to the search context; a suggestion for a query related to the search context; and/or a result of a search using a test query automatically generated from the search context.

In some embodiments, the portion of the content is a predetermined portion. In other embodiments, the portion of the content may be selectable by the user; in the event that the user activates the submission control element without selecting the search context, all of the content of the page might be selected as the search context. For example, the selection control element may include a selection expander configured such that initial operation of the selection expander selects a small portion of the content (e.g., a word) and repeated operation of the selection expander selects increasingly larger portions of the content, e.g., increasing the selected portion in units corresponding to one or more sentences or increasing the selected portion to correspond to a substantially circular region centered approximately on the word.

In some embodiments, in the event that the user activates the submission control element without entering one or more query terms, the search context is used to automatically generate one or more query terms for the search engine.

In some embodiments, the query entry area, the context selection element and the submission control element are accessible while the user is viewing any page. For example, the graphical user interface may be configured as a toolbar for a document viewer. In another embodiment, the query entry area, the context selection element and the submission control element are accessible while the user is viewing a page that is not distributed via a network.

The following detailed description together with the accompanying drawings will provide a better understanding of the nature and advantages of the present invention.

BRIEF DESCRIPTION OF THE DRAWINGS

FIG. 6 is an illustration of a Web page with multiple contextual search interfaces according to an embodiment of the present invention.

FIG. 14 is an illustration of a Web page with contextual search interfaces including augmented content according to an embodiment of the present invention.

FIGS. 18A-18C are illustrations of a text selection tool for a contextual search according to an embodiment of the present invention.

FIG. 20 is an illustration of a search results page with a user-editable context vector according to an embodiment of the present invention.

DETAILED DESCRIPTION OF THE INVENTION

I. Overview

A. Network Implementation

Figure 1:
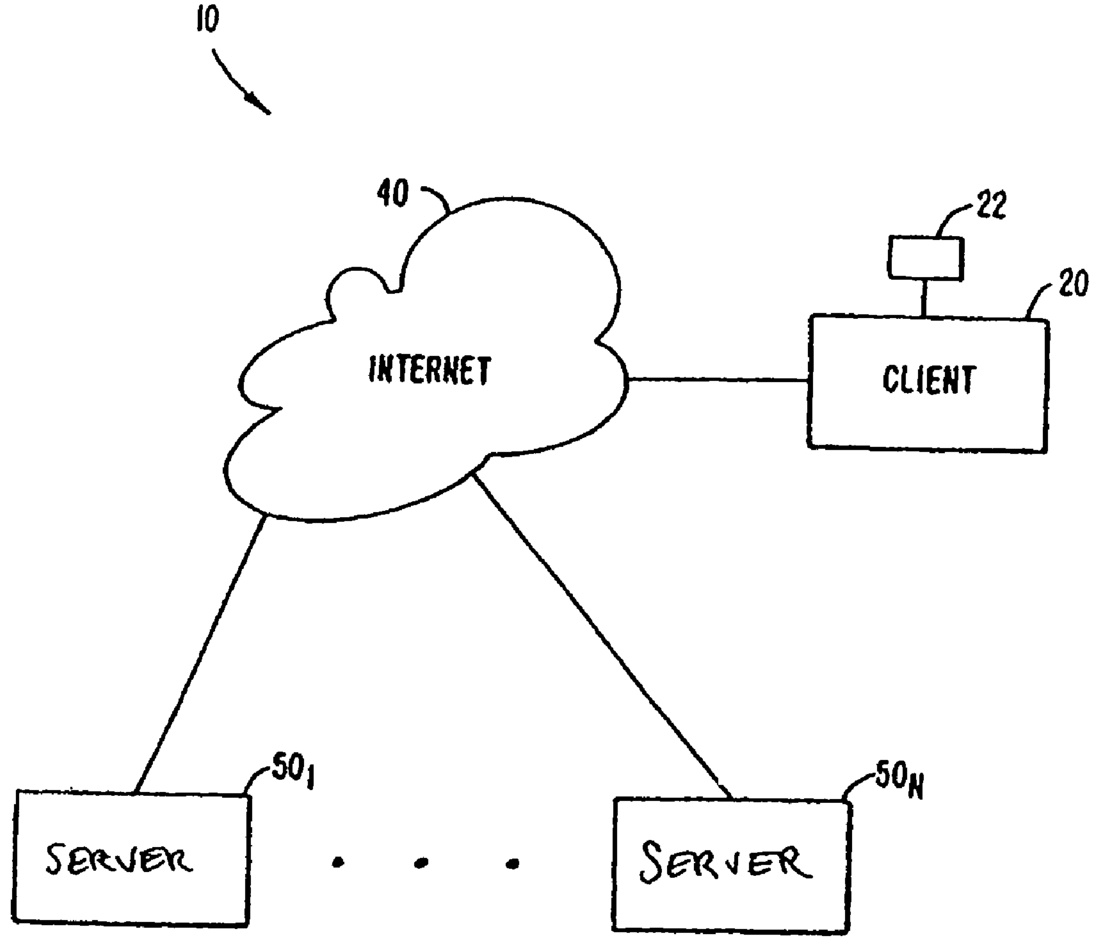
FIG. 1 is a high-level block diagram of an information retrieval and communication network including a client system according to an embodiment of the present invention.

FIG. 1 illustrates a general overview of an information retrieval and communication network 10 including a client system 20 according to an embodiment of the present invention. In computer network 10, client system 20 is coupled through the Internet 40, or other communication network, e.g., over any local area network (LAN) or wide area network (WAN) connection, to any number of server systems 501 to 50N. As will be described herein, client system 20 is configured according to the present invention to communicate with any of server systems 501 to 50N, e.g., to access, receive, retrieve and display media content and other information such as Web pages.

Several elements in the system shown in FIG. 1 include conventional, well-known elements that need not be explained in detail here. For example, client system 20 could include a desktop personal computer, workstation, laptop, personal digital assistant (PDA), cell phone, or any WAP-enabled device or any other computing device capable of interfacing directly or indirectly to the Internet. Client system 20 typically runs a browsing program, such as Microsoft's Internet Explorer™ browser, Netscape Navigator™ browser, Mozilla™ browser, Opera™ browser, or a WAP-enabled browser in the case of a cell phone, PDA or other wireless device, or the like, allowing a user of client system 20 to access, process and view information and pages available to it from server systems 501 to 50N over Internet 40. Client system 20 also typically includes one or more user interface devices 22, such as a keyboard, a mouse, touch screen, pen or the like, for interacting with a graphical user interface (GUI) provided by the browser on a display (e.g., monitor screen, LCD display, etc.), in conjunction with pages, forms and other information provided by server systems 501 to 50N or other servers. The present invention is suitable for use with the Internet, which refers to a specific global internetwork of networks. However, it should be understood that other networks can be used instead of or in addition to the Internet, such as an intranet, an extranet, a virtual private network (VPN), a non-TCP/IP based network, any LAN or WAN or the like.

According to one embodiment, client system 20 and all of its components are operator configurable using an application including computer code run using a central processing unit such as an Intel Pentium™ processor, AMD Athlon™ processor, or the like or multiple processors. Computer code for operating and configuring client system 20 to communicate, process and display data and media content as described herein is preferably downloaded and stored on a hard disk, but the entire program code, or portions thereof, may also be stored in any other volatile or non-volatile memory medium or device as is well known, such as a ROM or RAM, or provided on any media capable of storing program code, such as a compact disk (CD) medium, a digital versatile disk (DVD) medium, a floppy disk, and the like. Additionally, the entire program code, or portions thereof, may be transmitted and downloaded from a software source, e.g., from one of server systems 501 to 50N to client system 20 over the Internet, or transmitted over any other network connection (e.g., extranet, VPN, LAN, or other conventional networks) using any communication medium and protocols (e.g., TCP/IP, HTTP, HTTPS, Ethernet, or other conventional media and protocols).

It should be appreciated that computer code for implementing aspects of the present invention can be C, C++, HTML, XML, Java, JavaScript, etc. code, or any other suitable scripting language (e.g., VBScript), or any other suitable programming language that can be executed on client system 20 or compiled to execute on client system 20. In some embodiments, no code is downloaded to client system 20, and needed code is executed by a server, or code already present at client system 20 is executed.

B. Search System

Figure 2:
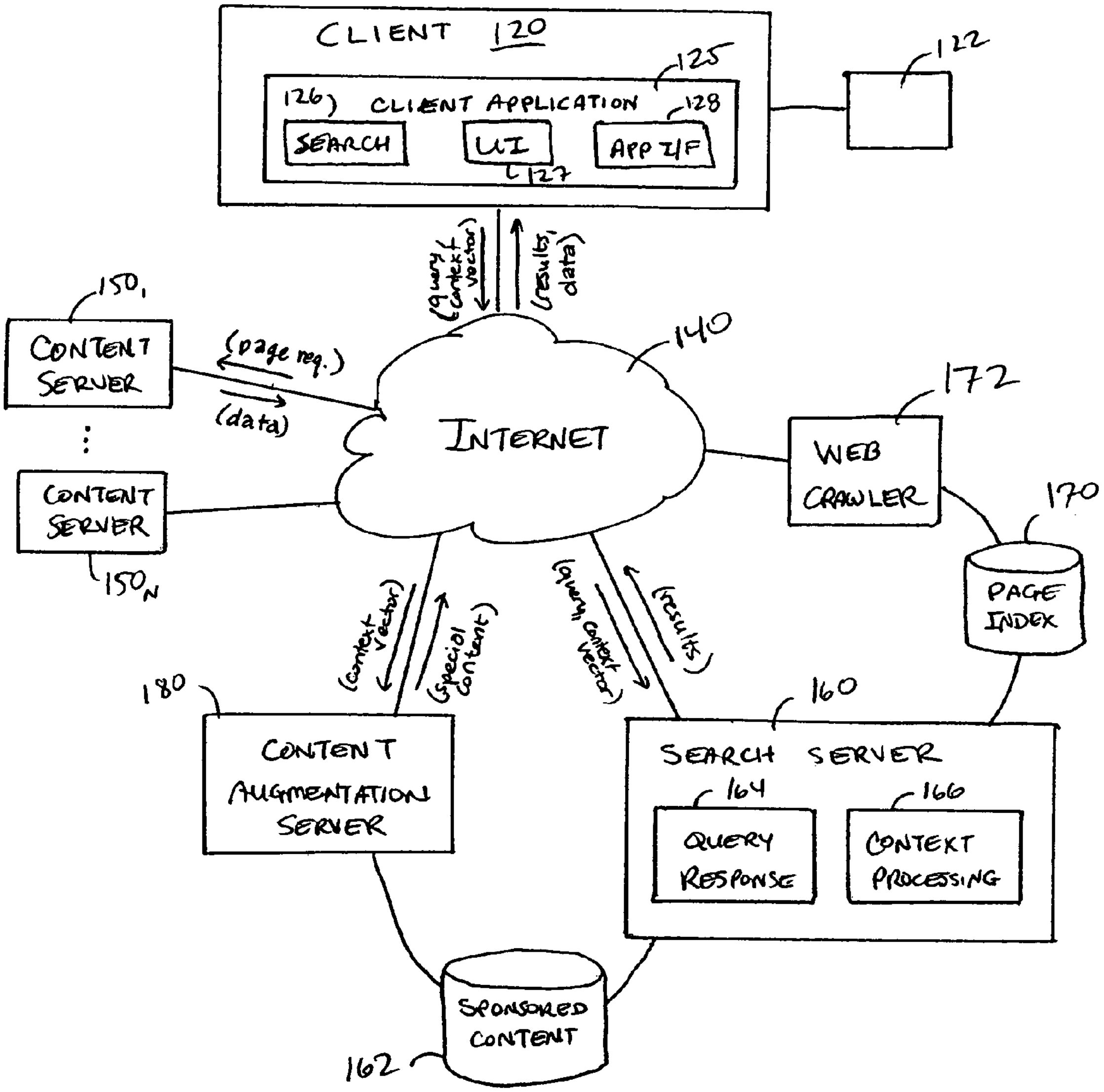
FIG. 2 is a block diagram of another information retrieval and communication network according to an embodiment of the invention.

FIG. 2 illustrates another information retrieval and communication network 110 for communicating media content according to an embodiment of the invention. As shown, network 110 includes client system 120, one or more content server systems 150, and a search server system 160. In network 110, client system 120 is communicably coupled through Internet 140 or other communication network to server systems 150 and 160. As discussed above, client system 120 and its components are configured to communicate with server systems 150 and 160 and other server systems over Internet 140 or other communication networks.

1. Client System

According to one embodiment, a client application (represented as module 125) executing on client system 120 includes instructions for controlling client system 120 and its components to communicate with server systems 150 and 160 and to process and display data content received therefrom. Client application 125 may be transmitted and downloaded to client system 120 from a software source such as a remote server system (e.g., server systems 150, server system 160 or other remote server system), or client application module 125 may also be provided on any software storage medium (floppy disk, CD, DVD, etc.) that is readable by client system 120 as discussed above. For example, in one aspect, client application 125 may be provided over Internet 140 to client system 120 in an HTML wrapper including various controls such as, for example, embedded JavaScript or Active X controls, for manipulating data and rendering data in various objects, frames and windows.

Client application module 125 advantageously includes various software modules for processing data and media content. In one embodiment, these modules include a specialized search module 126, a user interface module 127, and an application interface module 128. Specialized search module 126 is configured for processing search requests (also referred to herein as queries) to be sent to search server 160 and search result data received from search server 160. Specific aspects of specialized search module 126 are described below.

User interface module 127 is configured for rendering data and media content in text and data frames and active windows, e.g., browser windows and dialog boxes. In some embodiments, user interface module 127 includes or communicates with a browser program, which may be a default browser configured on client system 120 or a different browser. Application interface module 128 is configured to support interfacing and communicating between client application 125 and various other applications executing on client 120, such as e-mail applications, instant messaging (IM) applications, browser applications, document management applications and others.

User interface module 127 advantageously provides user input interfaces allowing the user to enter queries for processing by search server system 160. For example, where user interface module 127 includes or communicates with a browser, the user may be able to enter a URL or activate a control button to direct the browser to a Web search page (or site) from which the user can submit a query to search server system 160 for processing. In addition or instead, user interface module 127 may include a search toolbar or other interface via which the user can enter and submit a query without first navigating to the search page. Queries entered using user interface module 127 may be preprocessed by specialized search module 126 prior to being sent to search server system 160, e.g., to remove so-called "stop words" ("the," "and," etc.), to correct spelling errors, or the like.

In accordance with an embodiment of the present invention, client application 125 may include various features for adding context data (referred to herein as a "context vector") to the user's queries. For example, specialized search module 126 may be configured to generate context vectors based on content the user is currently viewing at the time a query is entered. As another example, in some embodiments of the present invention, Web pages displayed in the browser may include one or more context vectors that can be used to supplement user-entered queries. User interface module 127 may be configured to detect such contextual vectors in a page being displayed and use context vector data to supplement a query entered by the user. These and other features are described further below.

2. Search Server System

According to one embodiment of the invention, search server system 160 is configured to provide search result data and media content to client system 120, and content server system 150 is configured to provide data and media content such as Web pages to client system 120, for example, in response to links selected by the user in search result pages provided by search server system 160. In some variations, search server system 160 returns content as well as, or instead of, links and/or other references to content.

Search server system 160 references various page indexes 170 that are populated with, e.g., pages, links to pages, data representing the content of indexed pages, etc. Page indexes may be generated by various collection technologies such as an automatic Web crawler 172; in addition, manual or semi-automatic classification algorithms and interfaces may be provided for classifying and ranking Web pages within a hierarchical category structure. Such technologies and algorithms may be of generally conventional design, and a detailed description is omitted as not being critical to the present invention.

In one embodiment, an entry in page index 170 includes a search term, a reference (e.g., a URL or other encoded identifier) to a page in which that term appears and a context identifier for the page. The context identifier may be used for grouping similar results for search terms that may have different meanings in different contexts. For example, the search term "jaguar" may refer to the British automobile, to an animal, to a professional football team, and so on. The context identifier for a page can be used to indicate which of these contexts is applicable. In one embodiment, the context identifier includes a category for the page, with the category being assigned from a predefined hierarchical taxonomy of content categories. A page reference may be associated with multiple context identifiers, so the same page (or a link thereto) may be displayed in multiple contexts. In some embodiments, context identifiers are automatically associated with page links by the system as users perform various searches; the identifiers may also be modified and associated with links manually by a team of one or more index editors.

Search server system 160 is configured to provide data responsive to various search requests received from a client system 120, in particular from search module 126 and/or user interface module 127. For example, search server system 160 may include a query response module 164 that is configured with search related algorithms for identifying and ranking Web pages relative to a given query, e.g., based on a combination of logical relevance (which may be measured by patterns of occurrence of search terms in the query), context identifiers, page sponsorship, etc.

In accordance with an embodiment of the present invention, query response module 164 is also configured to receive and make use of context vector data that may be provided in association with a query in order to further enhance the response to queries. Use of context vector data in responding to queries is described further below. Query response module 164 may also enhance search result information with additional information (e.g., links and/or advertising copy) obtained from a sponsored content database 162. Sponsored content database 162 may be implemented as part of page index 170 by the inclusion of additional fields in each entry to identify page references that are sponsored and keywords for triggering the display of sponsored content, or it may be implemented in a separate database.

In some embodiments, search server 160 also includes a context processing module 166 that is configured with various algorithms for processing received content to generate a context vector representative of the received content. In general, a context vector may include any data that represents all or part of the content. For example, one embodiment of a context vector for text content may include keywords such as terms (e.g., words or phrases) that appear in the content, and each such term may have an associated frequency count reflecting how many times that term occurs in the content. Other types of data may also be included, e.g., URLs or other data identifying any links that may be included in the content, the URL or other identifier of the page that contains the content, category data associated with the content or with a page that contains the content, and so on.

In some embodiments, a content augmentation server 180 is also provided. Content augmentation server 180 communicates via Internet 140 with client application 125 to enhance the content of a Web page being displayed with "special content" that is advantageously selected based on context vector data associated with the displayed page. In circumstances where the user has indicated an interest in information related to a particular context (examples are described below), client application 125 transmits a context vector to content augmentation server 180, and content augmentation server 180 responds with special content to be added to a Web page being displayed by client application 125.

In one embodiment, content augmentation server 180 and search server 160 are under common control, and content augmentation server 180 advantageously selects special content from sponsored content database 162. In another embodiment, content augmentation server 180 may be independent of search server 160 and may have its own database of special content from which selections can be made based on context vectors provided by client application 125.

It will be appreciated that the search system described herein is illustrative and that variations and modifications are possible. The content server, search server, and content augmentation server systems may be part of a single organization, e.g., a distributed server system such as that provided to users by Yahoo! Inc., or they may be part of disparate organizations. Each server system generally includes at least one server and an associated database system, and may include multiple servers and associated database systems, and although shown as a single block, may be geographically distributed. For example, all servers of a search server system may be located in close proximity to one another (e.g., in a server farm located in a single building or campus), or they may be distributed at locations remote from one another (e.g., one or more servers located in city A and one or more servers located in city B). Thus, as used herein, a "server system" typically includes one or more logically and/or physically connected servers distributed locally or across one or more geographic locations; the terms "server" and "server system" are used interchangeably.

The search server system may be configured with one or more page indexes and algorithms for accessing the page index(es) and providing search results to users in response to search queries received from client systems. The search server system might generate the page indexes itself, receive page indexes from another source (e.g., a separate server system), or receive page indexes from another source and perform further processing thereof (e.g., addition or updating of the context identifiers).

C. Contextual Search Interface

As mentioned above, user interface module 127 of client application 125 generally includes one or more interfaces enabling the user to submit queries to search server 160, e.g., by navigating a browser to a search page hosted by search server 160 or by providing a toolbar interface for query submission. Such interfaces may be implemented in a generally conventional fashion.

In accordance with an embodiment of the present invention, in addition to (or instead of) such interfaces, users may also enter contextual queries using a "contextual search" interface that may be implemented as a visible element on any "hosting" Web page. (As used herein, the term "hosting Web page," or "hosting page," is to be understood as referring to any page that includes at least one contextual search interface; hosting pages might or might not be under common control with search server 160 or content augmentation server 180.) Each contextual search interface has a context vector associated with it. The context vector, which need not be visible on the hosting page, provides additional data reflecting the content of the hosting page (or a portion thereof). This data can be used e.g., by query response module 164, during query processing as described below.

Figures 3, 4:
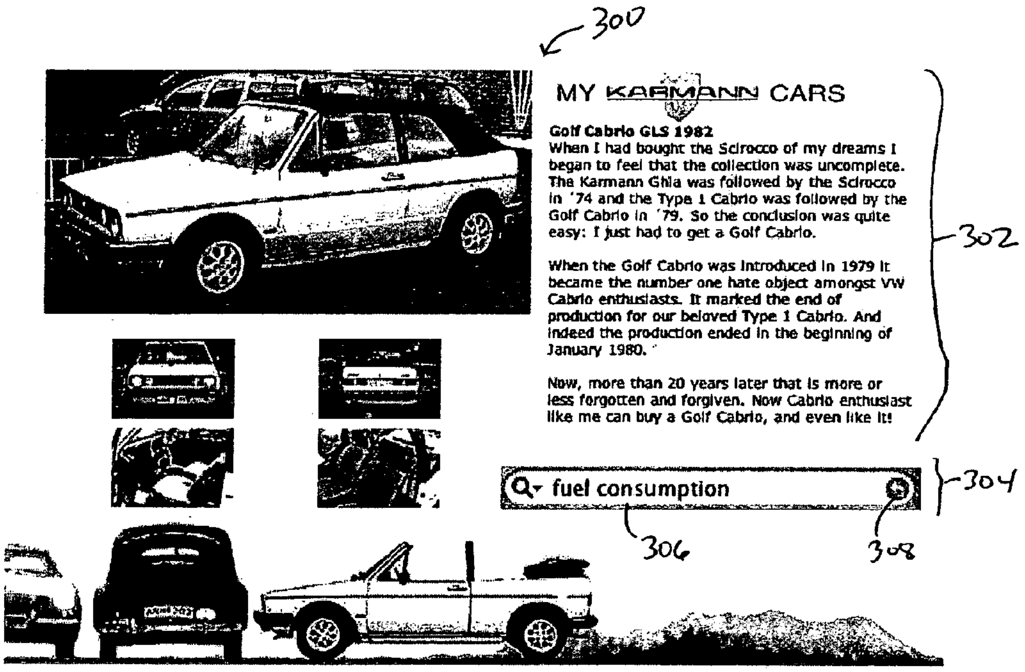
FIG. 3 is an illustration of a Web page with a contextual search interface according to an embodiment of the present invention.
FIG. 4 is an illustration of a context vector for a contextual search according to an embodiment of the present invention.

An example of a contextual search interface will now be described. FIG. 3 shows a hosting page 300 that has some content 302, as it might appear when displayed on client system 120 of FIG. 2. Hosting page 300 includes a contextual search interface 304 that is advantageously placed near content 302. A user may initiate a contextual search by entering a query (e.g., "fuel consumption") into a text field 306 of interface 304 and activating a "submit" control 308, which may be, e.g., a clickable button. The source code (not shown) for hosting page 300 includes a context vector associated with contextual search interface 304. In this embodiment, the context vector is not actually displayed in page 300, although its data is included with the source code provided to client application 125 when page 300 is requested.

The context vector, which may be implemented in various ways, advantageously includes one or more terms and/or category labels (or any other data) representative of the neighboring content 302. FIG. 4 is an example of a context vector 400 that might be provided for a search initiated from contextual search interface 304 of FIG. 3. Context vector 400 includes a list of terms 402 ("cabrio," "golf," etc.) that appear in content 302 and additional information associated with each term. In this example, the additional information includes a term frequency 404, a document frequency 406, a weight 408, and a term type 410. Term frequency 404 reflects the number of times the term occurs in content 302. Document frequency 406 reflects the number of documents in the search corpus that contain the term. Weight 408 reflects an importance assigned to the term and may be computed from information such as whether the term occurs in text or in headings, the term frequency 404, and/or the document frequency 406. Term type 410 can be used to distinguish different types of data that may be included in the context vector, e.g., terms from the text, category data, URL data, and so on. It is to be understood that a context vector may also include more, fewer, or different elements from those shown in FIG. 4, and the elements may be provided in any desired format. In one embodiment, context vector 400 is included in the source code for hosting page 300 in association with the code for contextual search interface 304.

When a user using client application 125 (of FIG. 2) to view hosting page 300 initiates a search by entering a query into text field 306 and activating submit control 308, the query that is sent by client application 125 to search server 160 for processing advantageously includes not only the explicit user input from text field 306 but also a representation of context vector 400. For example, in one implementation of contextual search interface 304, Web page 300 includes program code for sending an HTTP (hypertext transport protocol) request to search server 160 in response to submit control 308. This program code can include code for appending the user's query and a representation of the context vector as additional data to the URL used for the HTTP request.

In addition to the user's query (from text field 306) and context vector 400, search server 160 may also receive other metadata, such as an identifier of the user (if known), the user's IP address, the time of day, and so on. This metadata, which might or might not be specific to the hosting page or the contextual search interface, may be obtained from client application 125 or from other sources.

Upon receiving a query initiated through contextual search interface 304, search server 160 uses query response module 164 to execute a search based on the user's query and the context vector (and optionally any other available metadata). Query response module 164 generates and ranks a list of hits. The resulting list of hits, which generally depends at least in part on the context vector, is returned to the user, e.g., in the form of a search results page. In executing the search, the context vector may be used in various ways. For instance, in one embodiment, the user's query (e.g., the explicit input in text field 306 in FIG. 3) is modified by adding one or more keywords selected from the context vector; in another embodiment, the search is executed using the user's query as submitted, with keywords and/or category data from the context vector used in ranking the results. Additional embodiments are described below.

Figure 5:
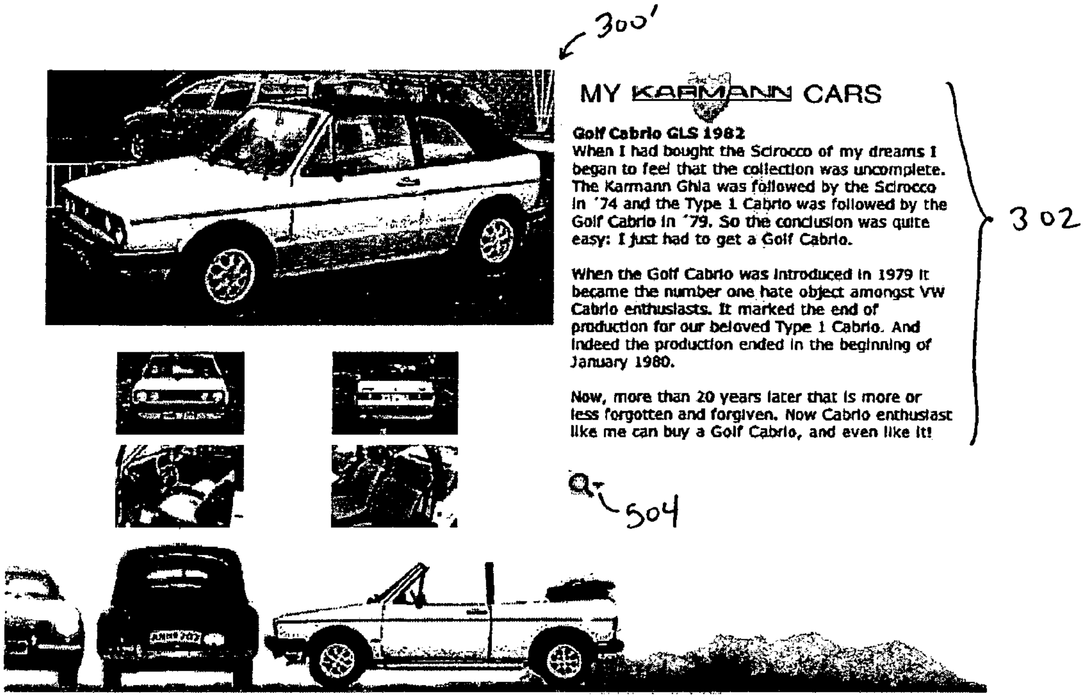
FIG. 5 is an illustration of a Web page with a contextual search interface in an inactive state according to an embodiment of the present invention.

In some embodiments, contextual search interfaces for a hosting page may be initially displayed in an "inactive" state in which only a relatively small icon appears on the page. An example of an inactive contextual search interface is illustrated in FIG. 5. Hosting page 300' is generated from the same source code as hosting page 300 of FIG. 3 and has the same content 302. In page 300', however, only a small contextual search icon 504 is displayed, rather than the full contextual search interface 304 shown in FIG. 3. Icon 504 represents an inactive contextual search interface; a user viewing page 300' who desires to perform a contextual search related to content 302 can activate the contextual search interface, e.g., by clicking on or otherwise selecting icon 504. Selecting icon 504 causes page 300 of FIG. 3, with the active contextual search interface 304, to be displayed so that the user can perform a contextual search.

Any number of contextual search interfaces may be provided on a hosting page, and each contextual search interface may have its own context vector that reflects the nearby content. For example, FIG. 6 shows a hosting page 600 whose content includes several summaries 602, 604, 606 of different news stories. Each summary 602, 604, 606 has a respective contextual search icon 612, 614, 616 placed near it. Each icon 612, 614, 616 is the inactive state of a different contextual search interface, each of which has its own context vector derived from the adjacent summary 602, 604, 606. Any one of these icons can be activated by a user and then used to initiate a contextual search (e.g., in the same manner as described above with reference to icon 504 and active contextual search interface 304). The context vector for a search initiated from icon 612 is advantageously derived from summary 602 while the context vector for a search initiated from icon 614 is advantageously derived from summary 604 and so on. Since icons 612 and 614 have different associated context vectors, the search results (the hits or their ranking or both) will generally differ for searches initiated via icons 612 and 614, even if the same query is entered.

In one embodiment, described further below, the creator of a hosting page may determine how many contextual search interfaces to include on the page, where they are to be located, and which portion(s) of the page should be used to define the context for the search.

The following sections describe example embodiments for creation of contextual search interfaces and context vectors (Section II), use of context vectors in processing queries (Section III), and additional optional features for further enhancing contextual searches, including additional examples of user interfaces (Sections IV-VI).

II. Creation of Contextual Search Interfaces and Context Vectors

Contextual search interfaces and context vectors can be created in advance of a contextual search operation, e.g., under control of a content developer, or at the time of a contextual search operation, e.g., under user control. In the embodiment of FIG. 2, context processing module 166 provides services for creating context vectors on demand in response to requests from various client programs, including content development clients and/or Web browser clients executing on client system 120.

Creation of contextual search interfaces will now be described with reference to FIG. 7, a simplified block diagram of a context vector server system 700 according to an embodiment of the present invention. A context module 702 communicates with a context client 704, e.g., via the Internet. Context module 702 advantageously corresponds to context processing module 166 of FIG. 2 and may be implemented as a component of search server 160 as shown in FIG. 2 or in a separate computer system. Context client 704 may be, e.g., a content development program that is capable of adding contextual search interfaces to page content, or a browser program that is capable of initiating a contextual search.

Context module 702 communicates with a number of dictionaries that may be implemented in one or more databases or other data stores of generally conventional design. As used herein, "dictionary" refers generally to any data store in which information related to a word or phrase is retrievable by a lookup operation using the word or phrase as an index; a dictionary is not limited to any particular information content and might or might not provide an exhaustive list of words and/or phrases.

In system 700 four dictionaries are provided. Term dictionary 706 includes a list of terms (which may include single words and/or phrases) derived from a search corpus (e.g., as represented in page index 170 of FIG. 2). Each term in term dictionary 706 is advantageously associated with a "document frequency" that reflects the number (or fraction) of documents in the search corpus that include at least one occurrence of that term.

Segment dictionary 708 includes phrases ("segments") extracted from documents in the search corpus. Each segment in dictionary 708 represents a group of contiguous words found in the same arrangement in at least a minimum number (or fraction) of documents in the search corpus. A document frequency is advantageously stored in association with each segment in segment dictionary 708.

Concept network 710 is a representation of units (terms) and relationships among units that may be used in some embodiments to generate enhanced context vectors, e.g., by identifying terms related to terms that appear in the content from which the context vector is derived and/or terms related to query terms provided by the user. Specific examples of concept network 710 and its use in forming enhanced context vectors are described in above-referenced application Ser. No. 11/033,100.

Stopword dictionary 712 includes words that occur so frequently as to be meaningless for purposes of selecting documents. Examples include articles ("a", "the", etc.); conjunctions ("and", "but"); prepositions ("to", "on", "in"); and so on. As described below, stopword dictionary 712 is advantageously used to exclude words from a context vector.

It is to be understood that the specific combination of dictionaries described herein is illustrative and that other combinations may be used.

In operation, context client 704 transmits text (and optionally one or more query terms) to context module 702. Context module 702 may use any combination of dictionaries 706, 708, 710, 712 (or other dictionaries) for generating context vectors; specific examples of algorithms that can be employed are described below. Once the context vector is generated, context module 702 may return it to context client 704 or provide it directly to search server 160 for use in query processing.

A. By Content Providers

In some embodiments, one or more contextual search interfaces can be added to a Web page at the discretion of a content developer that creates the Web page. For example, a search provider (or other promulgator of contextual search technologies) may publish an application program interface (API) for implementing contextual searches. The API includes a format for specifying contextual search requests so that such requests can be recognized and processed by search server 160. In one embodiment, the API specifies a base URL for submitting contextual searches to search server 160 and a format for enhancing the base URL with additional data representing the user's query and the context vector. The API may also specify formats for encoding the query and/or context vector as appropriate to a particular implementation.

In some embodiments, the API may also specify the appearance and/or features of the contextual search interface. For example, the API might specify whether the interface should initially be displayed as an inactive-state icon, what such an icon should look like, and a standard phrase to be displayed with the icon to alert users to the opportunity for performing a contextual search. Other aspects of the API might specify features of the contextual search interface in its active state, such as whether a text box and/or other input fields are to be provided and what such fields should look like. While optional, providing uniform specifications for the esthetic aspects of contextual search may assist in promoting user awareness and recognition of contextual search interfaces.

All or part of the API may be provided by making available images that can be inserted into the Web page or suitable code blocks in commonly used Web page coding languages (such as HTML) that content creators can simply insert into their pages.

The content provider can implement a contextual search interface by including appropriate code in the source code for the hosting page and supplementing this code with appropriate data for a context vector representing the actual content of the hosting page. Any code in any language may be used, as long as execution of the code results in contextual search requests, in the API-compliant format, being generated and submitted to search server 160 in response to input to the contextual search interface.

In other embodiments, the search provider (or other promulgator of contextual search technologies) further facilitates creation of contextual search interfaces by content providers, e.g., by automating the generation of some or all of the contextual search code for a hosting page. As one example, generation of context vectors from hosting page content may advantageously be automated using context module 702 of FIG. 7. In this instance, a content development client 704 provides text to context module 702 and receives properly formatted contextual search code, including the context vector, in response.

Figure 7:
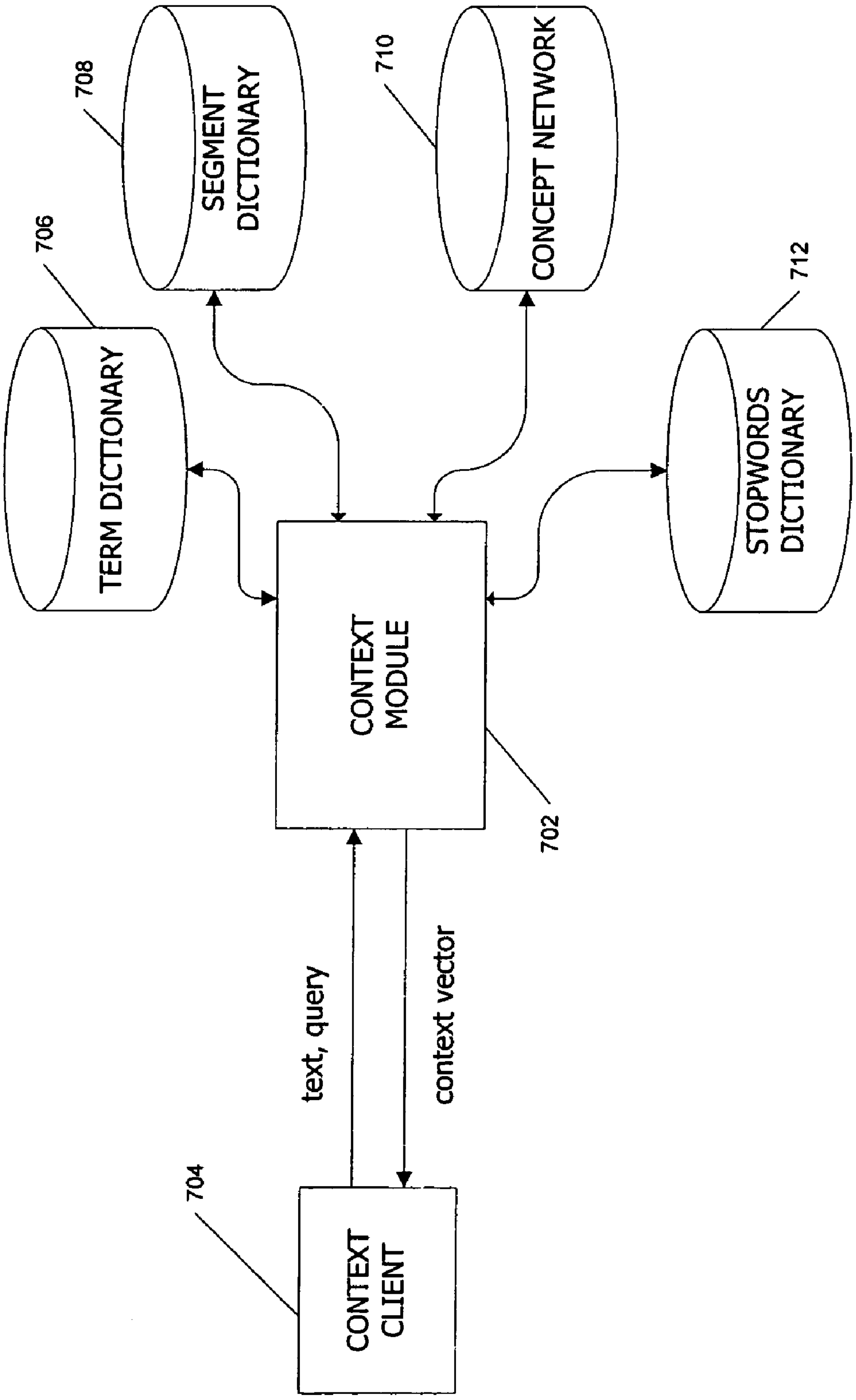
FIG. 7 is a simplified block diagram of a context vector server system according to an embodiment of the present invention.
Figure 9A:
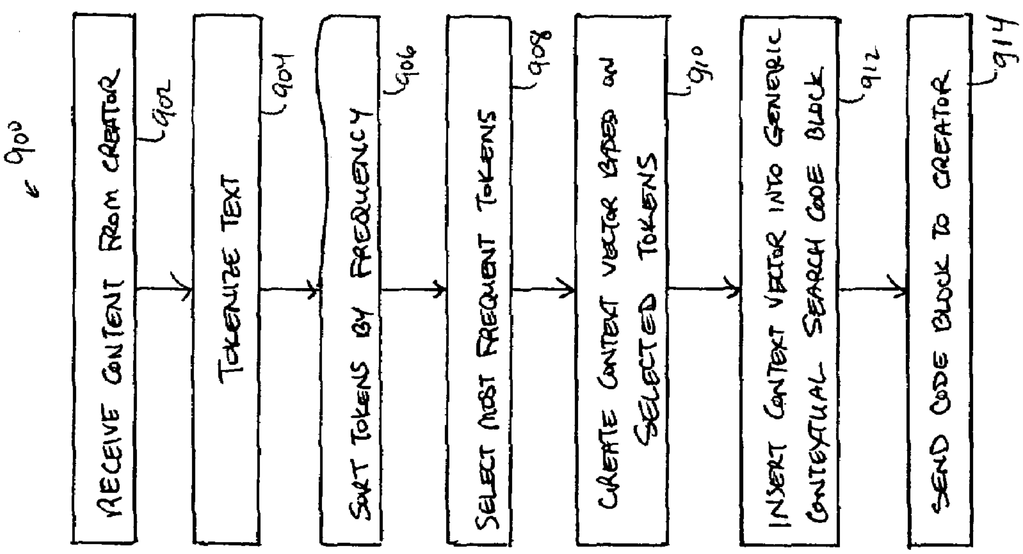
FIGS. 9A-9B are flow diagrams of processes for generating a context vector according to embodiments of the present invention.
Figure 8:
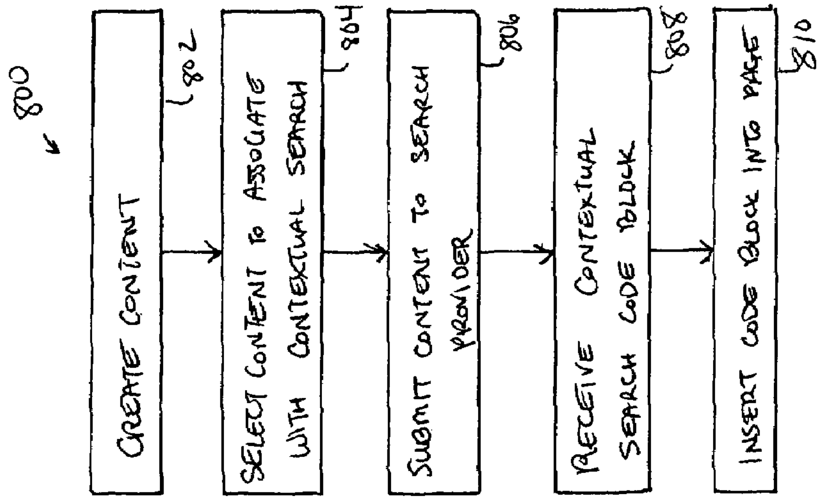
FIG. 8 is a flow diagram of a process performed by a content developer for creating a contextual search interface according to an embodiment of the present invention.
Figure 9B:
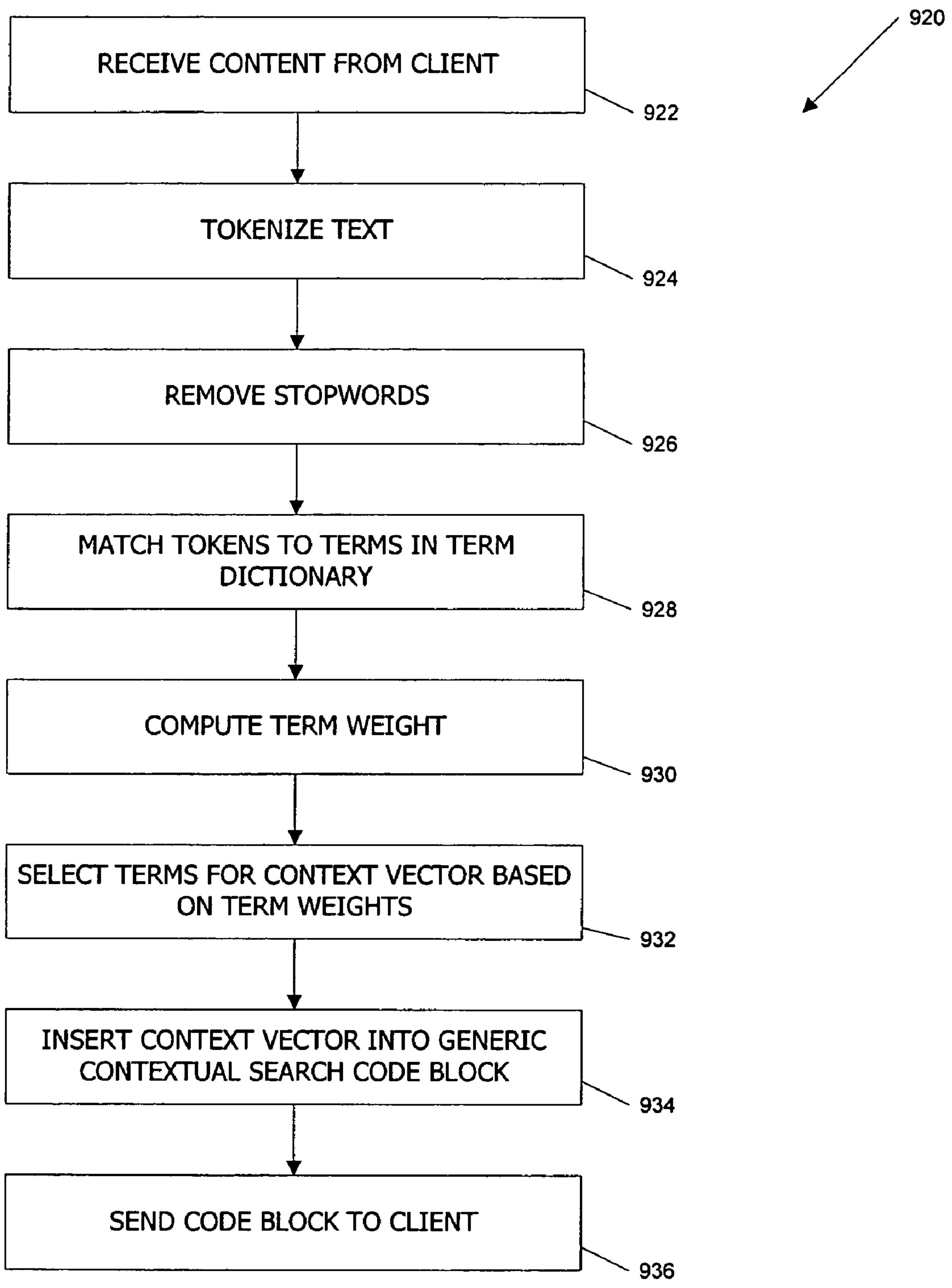

FIGS. 8 and 9A-9B are flow diagrams illustrating a partially automated process for creating a contextual search interface, with FIG. 8 showing a process 800 performed by the content developer using client 704 of FIG. 7 and FIGS. 9A-9B showing alternative processes that may be performed by context module 702.

Process 800 begins with the content developer creating or modifying content for a Web page (step 802) that is to include a conceptual search interface. The content may be created using any manual or automatic technique, including the use of conventional Web development software. At some point, the content developer determines that it would be desirable to have a contextual search interface associated with some portion (or all) of the hosting Web page's content. The content developer selects the content that is to be associated with the contextual search interface (step 804) and submits it to the context vector server (step 806).

Submission of content to the context vector server may be done in a number of ways. In some embodiments the search provider offers a Web-browser-based context analysis interface for content providers. This interface may be, e.g., an interface to context module 702 shown in FIG. 7. The content developer may navigate his own browser to this interface and enter (e.g., by copying and pasting) appropriate content from the hosting page. In other embodiments, the content developer may navigate a browser to the search provider's context analysis interface and submit a URL for the hosting Web page. In still other embodiments, the search provider may distribute a software tool (e.g., incorporating aspects of algorithms shown in FIGS. 9A-9B) that the content provider can use to select content and submit it to the search provider without using a Web browser. This tool may take various forms, such as a desktop tool or a widget that can be integrated into various Web content development software programs.

Upon receiving content from a developer, context module 702 analyzes the content and generates a context vector. FIG. 9A is a flow diagram of a process 900 that may be implemented in context module 702. Process 900 begins when content to be associated with a contextual search interface is received by context module 702 (step 902). The text may be received in, or converted to, a conventional encoding such as UTF-8.

At step 904, the received content is tokenized. Tokenizing may be done using conventional techniques and may include, e.g., detecting word boundaries (which may be based on Unicode or other conventional techniques), canonicalizing words (e.g., removing suffixes, correcting spelling errors or variants, and the like), eliminating various words that are too common to be helpful in searches (e.g., "the," "and"), and so on. At step 906, the tokens are sorted according to suitable criteria, such as frequency of occurrence of the term in the content, and at step 908 the most frequently occurring tokens are selected for inclusion in the context vector. The number of tokens selected may be limited, e.g., to some integer K.

At step 910, a context vector is created using the tokens. In one embodiment, the context vector includes the selected tokens as well as their respective frequencies and other optional information. In some embodiments, co-occurrences and correlations between tokens are also used to identify phrases that can also be incorporated into the context vector. (For instance, in content 302 of FIG. 3, the phrase "Golf Cabrio" might be identified.) In addition, URLs (or other identifiers) of any linked-to documents included in the content or a URL (or other identifier) for the content itself may also be included. More generally, any information representative of the content, or some aspect of the content, may be included in a context vector.

At step 912, the context vector is inserted into a block of generic code implementing a contextual search interface. In one embodiment, the generic code block includes a template for an enhanced URL that is to be used for sending contextual queries to the search server, and step 912 includes inserting the context vector (or an encoded representation thereof) into this template. The generic code block may also include other code, such as code for inserting the user's query into the enhanced URL before sending it to the search server, code for displaying the contextual search interface in its active and/or inactive states, and so on. The resulting code block, including the context vector, is returned to the content developer at step 914.

FIG. 9B is a flow diagram of an alternative process 920 that may be implemented in context module 702. Process 920 begins when content to be associated with a contextual search interface is received by context module 702 (step 922). At step 924, the received content is tokenized, e.g., as described above with reference to step 904 of process 900. At step 926, any stopwords in the tokenized text, e.g., by matching tokens to stopwords in stopwords dictionary 712 and discarding any tokens that match.

At step 928, the remaining tokens are matched to terms appearing in term dictionary 706. Any token that does not match a term in term dictionary 706 is discarded.

At step 930, a term weight for each remaining token is computed. The weight may be based on the inverse of the document frequency and/or the term frequency of the token (i.e., the number of times the term appears in the received text). In one embodiment, the term weight is based on the product of the inverse document frequency and the term frequency; the weight may be rescaled (e.g., linearly, logarithmically, exponentially) as desired. Other formulas for computing a term weight may be used.

At step 932, a number of tokens are selected as elements of a "term vector" based on the respective term weights. In some embodiments, the number of term vector elements is limited (e.g., to 5, 15, 25 or 50), with terms having higher term weight receiving priority. A cutoff at a minimum term weight may also be applied, with terms below the minimum weight being excluded from the term vector even if the result is a term vector with fewer than the maximum number of elements. Other selection techniques may also be used.

At step 934, the term vector is inserted as a context vector into a generic contextual search code block, and at step 936, the code block is returned to the client. These steps may be generally similar to steps 912 and 914 of process 900 described above.

Referring again to FIG. 8, at step 808 the content developer receives the code block from context processing module 166. At step 810, the content developer inserts the code block into the hosting Web page at the desired point, thereby adding the contextual search interface to the page.

It will be appreciated that the processes for creating contextual search interfaces described herein are illustrative and that variations and modifications are possible. Steps described as sequential may be executed in parallel, order of steps may be varied, and steps may be modified or combined. Various steps such as selection of content and insertion of the contextual search code block may be automated or performed manually. In one alternative embodiment, the search provider may provide a context processing module that can be installed and run on the content provider's system, so that information need not be sent to the search provider in order to create the context vector. In addition, in some embodiments creation of contextual search interfaces may be automated, e.g., so that a context vector is automatically updated when page content is updated. For instance, if page 400 of FIG. 4 represents a news page where the top stories are frequently changed, a process may be provided for automatically updating the context vector for one of the contextual search interfaces any time its associated story changes.

Other algorithms for generating context vectors may also be implemented. For example, some algorithms may weight terms that appear in headings, subheadings, metatags or other selected fields higher than terms in the body text. Some algorithms may also take into account non-textual content (e.g., images or media content) for which suitable content descriptors are available or can be determined. Terms in the context vector are not limited to single words; a term may also be a phrase (two or more words occurring adjacent to each other).

In some embodiments, the context vector may be created based on information other than terms found in the content. For instance, the content provider may be prompted to specify a category or other context identifier for the content, and this information may be included in the context vector. In another embodiment, the context vector may include information about links included in the content (e.g. the URLs of such links, page titles or category information for the linked-to pages, and so on). In still other embodiments, the context vector may be enhanced by using a concept network to identify terms related to terms that appear in the text or the initial context vector, e.g., as described in above-referenced application Ser. No. 11/033,100.

In some embodiments, the context vector may be included in the contextual search interface code block in an encoded form. For example, hash functions or other suitable techniques may be used to represent various tokens in the context vector. As another example, the complete context vector data might be stored in a table or database accessible to the search server, and the code block might include a key or other code that the search server can use to look up the context vector data during query processing.

B. By Users

In another embodiment, a user viewing any Web page can create a contextual search interface for that page (or for a portion thereof). For example, the search provider may provide a browser toolbar that has a "contextual search" widget enabling the user to select as context for a search query a portion of any Web page displayed in the browser window.

Figure 10:
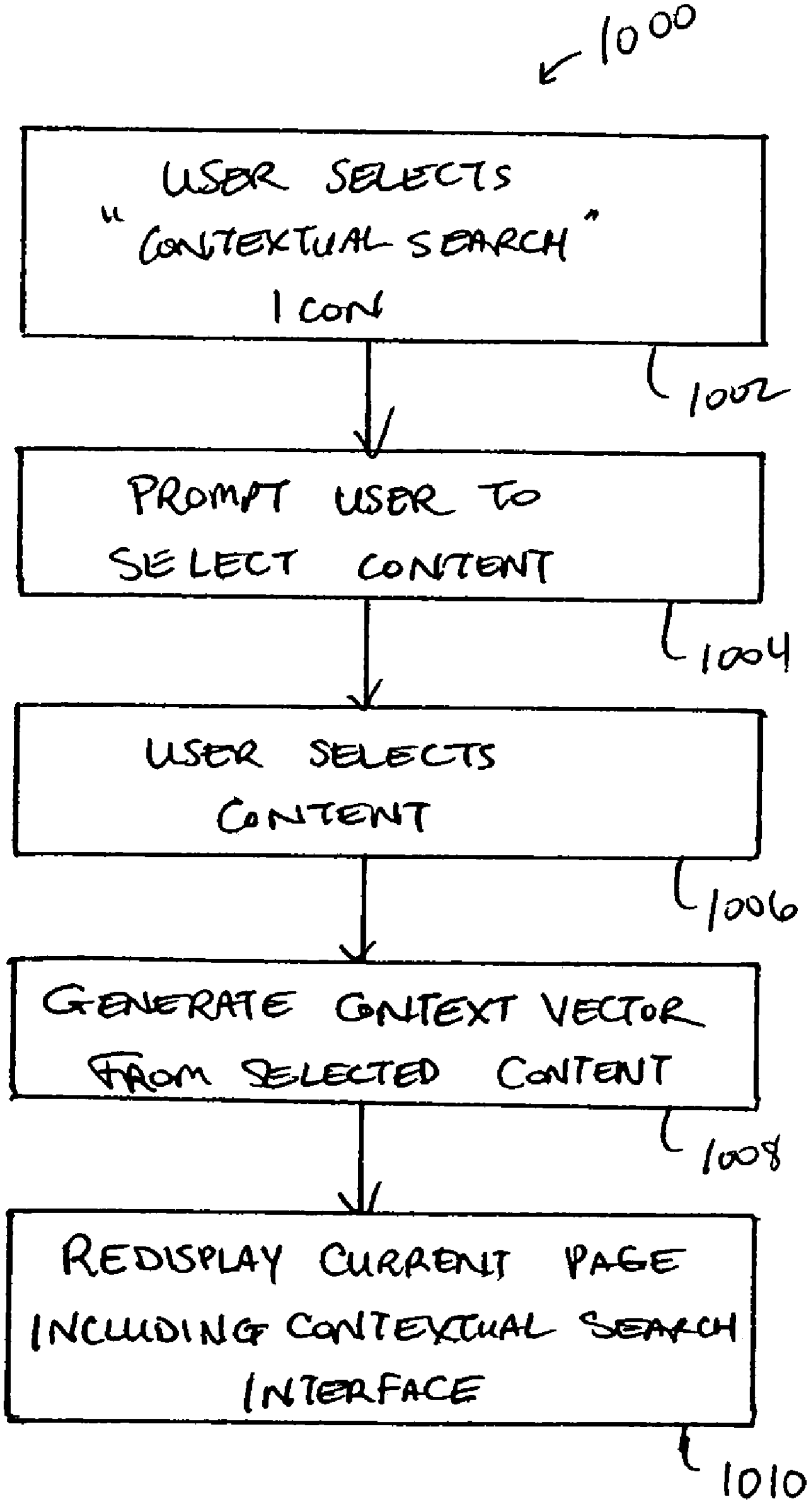
FIG. 10 is a flow diagram of a process for user creation of a contextual search interface according to an embodiment of the present invention.

FIG. 10 is a flow diagram of a process 1000 for user creation of a contextual search interface. When process 1000 begins, the user is viewing a Web page using a browser (e.g., an aspect of user interface module 127 of client application 125 of FIG. 2). The user's browser is equipped with a toolbar that has a "contextual search" widget. The page being viewed might or might not include a contextual search interface supplied by the content provider. At step 1002, while viewing the page, the user selects the "contextual search" button from the toolbar, e.g., by clicking on it. In response, at step 1004, the browser prompts the user to select a portion of the displayed page as context for the search. The prompt may include, e.g., changing a mouse cursor to a shape indicative of selection, and/or displaying a text prompt.

At step 1006, the user selects part or all of the displayed page, e.g., by clicking and dragging a mouse cursor over a region of the displayed page. Selected text may be shown with highlighting (e.g., modified colors or a box drawn around the content) to provide visual feedback to the user. In some embodiments, other content selection mechanisms may be provided in addition to or instead of click-and-drag techniques. For example, a user may be able to select the entire page by pressing a predefined key, to select a paragraph by clicking while the mouse cursor is positioned anywhere in the paragraph, or to select a section by clicking while the mouse cursor is positioned in the section heading.

At step 1008, client application 125 generates a context vector from the selected content. In one embodiment, client application 125 may submit the selected content to context processing module 166 at search server 160 for context-vector generation in accordance with process 900 described above. In another embodiment, client application 125 is configured to process content locally to generate a context vector (e.g., via steps of process 900) without transmitting information to the search server. Such processing capability may be implemented, e.g., by including a context processing module as part of specialized search module 126 of client application 125 of FIG. 2.

At step 1010, the browser redisplays the current page, adding a contextual search interface at or near the selected portion of the page. In this embodiment, the newly added contextual search interface may appear initially in an active state so that the user can simply enter and submit a query without first activating the interface, or it may appear in an inactive state. Once created, a user-created contextual search interface advantageously behaves similarly to contextual search interface 304 described above; specifically, when the user enters a query through a user-created contextual-search interface, the client application submits the query and the context vector associated with the user-created contextual search interface to the search server.

It will be appreciated that process 1000 is illustrative and that variations and modifications are possible. Steps described as sequential may be executed in parallel, order of steps may be varied, and steps may be modified or combined. For instance, the user may select the content first, then activate a "contextual search" button in the search toolbar. Instead of adding a contextual search interface to the Web page, a user-created contextual search interface may be placed in the toolbar (e.g., in place of a standard non-contextual search interface) or provided in a separate pop-up menu.

Figure 11:
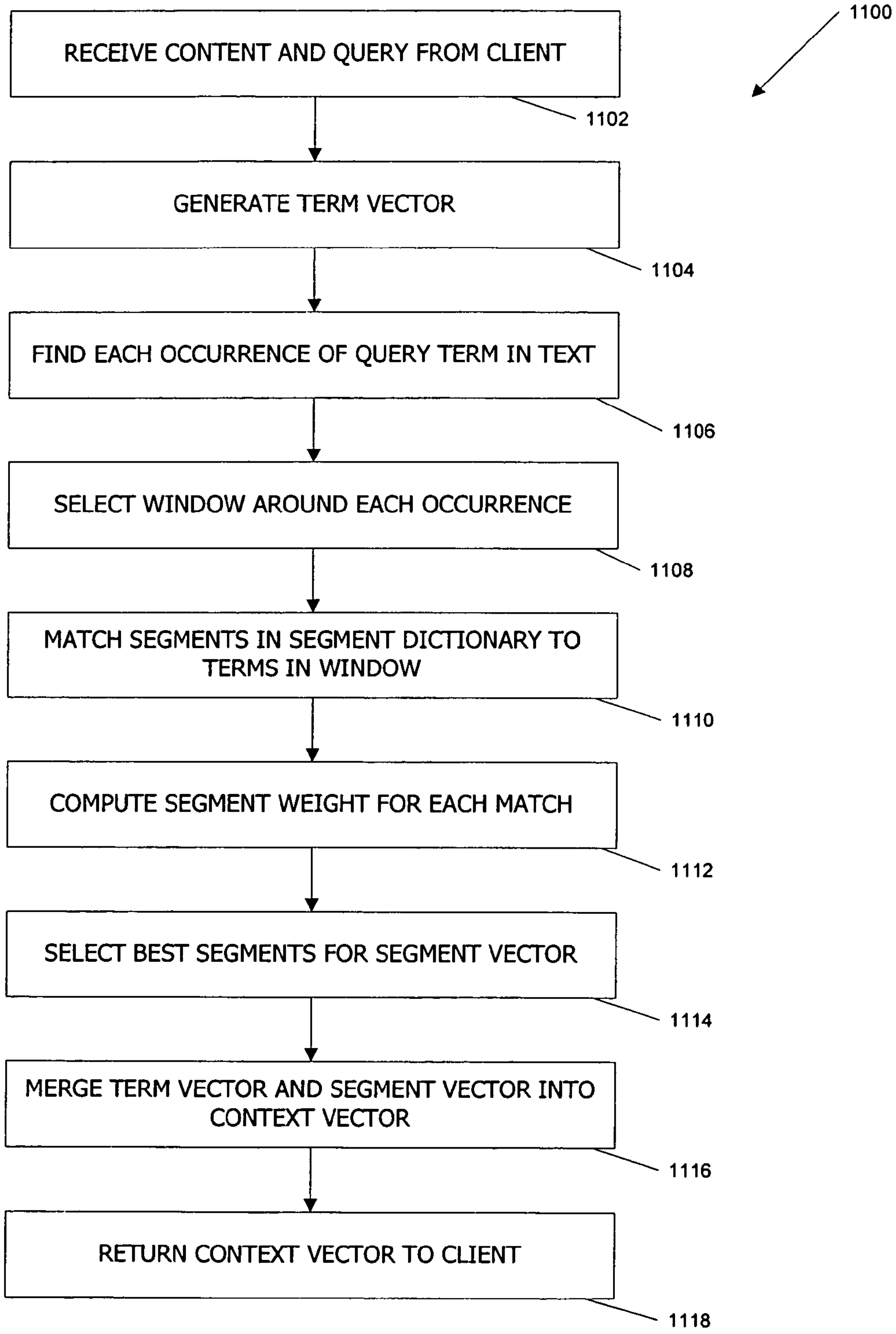
FIG. 11 is a flow diagram of a third process for generating a context vector according to an embodiment of the present invention.

In other embodiments, rather than generating a context vector in advance of a query, the client application may send the selected content together with the user's query to the search server, and the search server may generate the context vector (e.g., using context processing module 166) as part of its query processing activity. This context vector may be sent back to the client application, which may cache it for subsequent reuse.

Where selected content is submitted together with a query, the query may also be used in selecting terms for the context vector. FIG. 11 is a flow diagram of a process 1100 for generating a context vector from a combination of content and a query according to an embodiment of the present invention. Process 1100 may be implemented in the embodiment of FIG. 7, with context client 704 corresponding to a browser program that communicates with context module 702.

Process 1100 begins when content and a query for a contextual search are received by context module 702 (step 1102). At step 1104, a term vector is generated from the received content, e.g., in accordance with steps 924 through 932 of process 920 (FIG. 9B) described above.

At step 1106, the received text is parsed to identify each occurrence of a term from the received query. At step 1108, a window of text surrounding each occurrence of a query term is selected. In one embodiment, each window includes a fixed number of words (e.g., 2, 3, 5, 10) preceding and following the query term. At step 1110, each selected window is matched against segment dictionary 708 (FIG. 7); a match occurs if any segment in dictionary 708 appears in the window.

At step 1112, a segment weight is computed for each matched segment. Segment weights may be defined similarly to term weights described above. At step 1114, the segments with the highest weights are chosen for a "segment vector." As with the term vector, a minimum threshold weight may be applied, and the number of segments in the segment vector may be limited to a maximum value.

At step 1116, the segment vector is merged with the term vector generated at step 1104, creating a context vector. In one embodiment, the vectors may simply be concatenated. In another embodiment, terms from the term vector that also appear within a segment in the segment vector may be removed entirely or may have their term weights reduced. If desired, the total number of entries may be limited to some maximum number.

At step 1118, the context vector is returned to the client. In an alternative embodiment, the context vector may be forwarded, together with the received query, to a search server (e.g., search server 160 of FIG. 2) for immediate query processing.

It will be appreciated that process 1100 is illustrative and that variations and modifications are possible. Steps described as sequential may be executed in parallel, order of steps may be varied, and steps may be modified or combined. In some embodiments, the context vector may be further enhanced with information from a concept network, as described below.

In another embodiment, a user may be able to refine the context for a pre-existing contextual search interface, e.g., by selecting a portion of the accompanying text. Where such a selection is made, the context vector associated with the contextual search interface can be modified, e.g., to include only terms that appear in the selected text, thereby providing users a further degree of control over how the context is defined.

In still another embodiment, a client application might also include a module for creating contextual searches that is accessible via an icon on the user's desktop or in an operating system toolbar. Such a module may enable a user to create context vectors for performing contextual searches based on content other than Web pages, including documents open in a word processing or file viewer application, e-mail messages, instant messages, and the like. The user may activate this icon at any time, whether or not a browser is open, and may select content for creating the context vector from any document on her desktop (including any Web pages that happen to be displayed). The user-created contextual search interface for the selected content appears, e.g., in a pop-up menu or dialog box located near the selected content, or in any other suitable user interface element. When the search is executed and results are returned, the client application advantageously opens a browser window for displaying the results and allowing the user to navigate to the hit pages or sites.

III. Use of Context Vectors in Query Processing

As described above, when a contextual search interface such as interface 304 of FIG. 3 is active, a user may initiate a contextual search by entering a query into text field 306 and operating submit button 308. In response, contextual information, which can aid the search server in responding to the user's query, is supplied via a context vector (e.g., context vector 400 of FIG. 4) that is associated with the contextual search interface and automatically delivered to the search server with the user's query.

A search server (e.g., search server 160 of FIG. 2) receives a contextual search query, which includes both the user's query and the context vector, and executes the search, e.g., using query response module 164. Algorithms for processing contextual search queries advantageously exploit the premise that the user's interest is likely to be related to the neighboring content; accordingly, the context vector, which represents that content, is advantageously used in generating search results. It should be noted that a user who does not want a search to be connected to surrounding content may use a different interface (e.g., a search toolbar or the search provider's Web interface) to perform a non-contextual search, and search server 160 may be configured to process both contextual and non-contextual queries.

Figure 12:
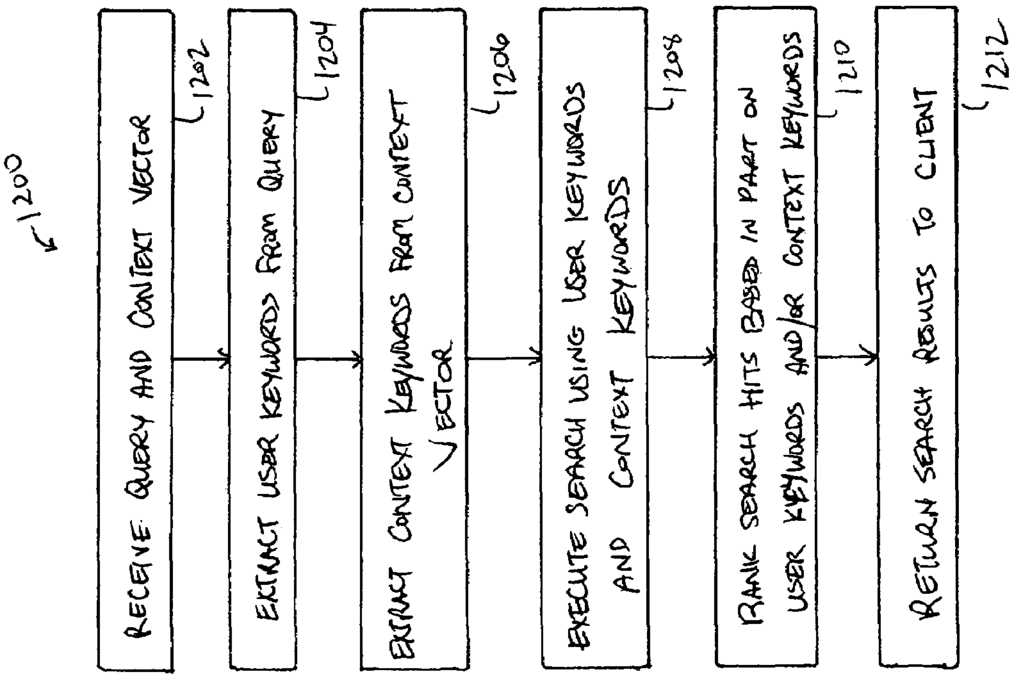
FIG. 12 is a flow diagram of a process for executing a contextual search according to an embodiment of the present invention.

Specific algorithms for processing contextual search queries will now be described. FIG. 12 is a flow diagram of one such process 1200, in which search terms provided by the user are supplemented using one or more additional terms from the context vector.

At step 1202, a contextual query, including at least one user-supplied term and an associated context vector, is received. At step 1204, one or more user keywords are extracted from the user-supplied terms, e.g., using conventional query parsing techniques, which may include detecting word boundaries, canonicalizing words (e.g., removing suffixes, correcting spelling errors or variants, and the like), eliminating words that are too common to be helpful in searches (e.g., "the," "and"), and so on.

At step 1206, one or more context keywords are extracted from the context vector to supplement the user keywords. In some embodiments, context vectors include terms that have already been parsed and canonicalized (e.g., as described for process 900 above) and so are already suitable for use as keywords. In other embodiments, parsing and canonicalization may be performed for terms in the context vector as well. In addition, step 1206 may include determining how many and which terms from the context vector should be used as context keywords. For instance, in some embodiments, only terms having at least a minimum frequency or weight might be selected, or a limit might be placed on the number of terms that can be selected, with the most frequent or highest weighted terms being selected first. The number of context keywords selected may also depend on the number of user keywords (e.g., for queries with more user keywords, fewer context keywords might be selected). Step 1206 may also include detecting and removing from the query any context keywords that are redundant with user keywords. Redundant keywords may include exact duplicates as well as known synonyms.

At step 1208, a search is executed using a query that includes the user keywords and the context keywords. Search execution may incorporate conventional techniques for identifying Web pages that contain one or more (or, in some embodiments, all) of the keywords; such pages are referred to herein as "hits" (or "search hits"). At step 1210, the search hits are ranked based on relevance as determined by a suitable ranking algorithm. Conventional algorithms for scoring each hit page based on frequency and/or proximity of keywords in the hit page may be used, with the user's keywords and/or the contextual keywords being taken into account in the scoring. In addition, any terms from the context vector that were not selected as keywords may be used in determining page scores or rankings. Other criteria, including the number of pages linking to the hit, user evaluations and preferences related to hit pages, and/or sponsorship of various hit pages may also be considered in determining the ranking.

At step 1212, the search results are returned to the user. In one embodiment, the results are returned as a Web page displayable via the user's browser, with links to the various hit pages or sites. The results page may be displayed, e.g., by redirecting the browser from the hosting page to the results page or by opening a new browser window for the results page. Where many hits are to be returned, multiple interlinked results pages may be generated. The results page may display both the user's original query and the context keywords that were added to the search query. In some embodiments, this information is presented using an interactive form via which the user can modify her query or the context keywords (or both) and submit the modified contextual query to search server 160.

Figure 13:
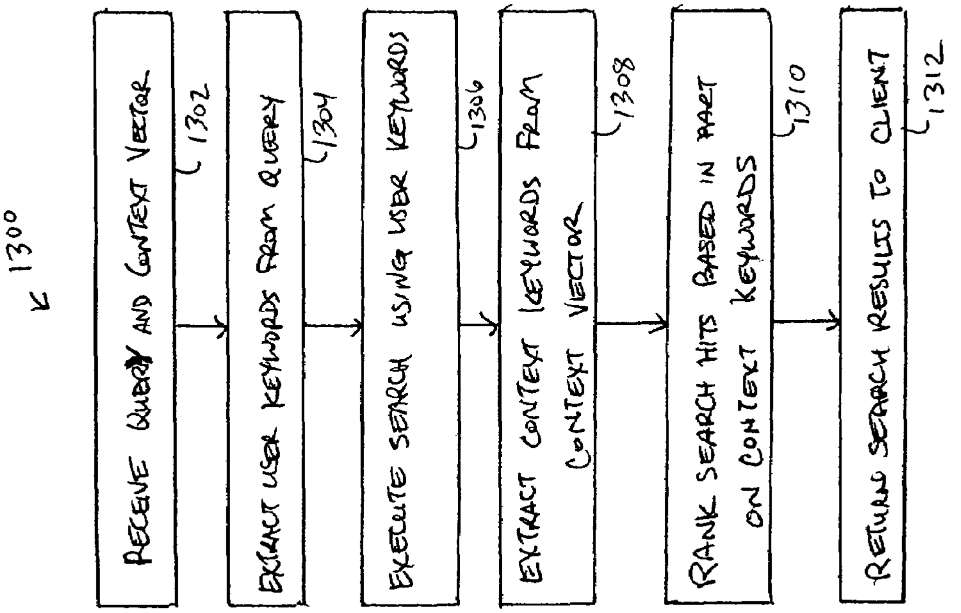
FIG. 13 is a flow diagram of another process for executing a contextual search according to an embodiment of the present invention.

FIG. 13 is a flow diagram of an alternative process 1300 for executing contextual searches. In process 1300, the user's query terms are used without additional context keywords to generate hits, and context data is incorporated into the ranking algorithm. More specifically, at step 1302, a contextual query, including at least one user-supplied term and an associated context vector, is received. At step 1304, one or more user keywords are extracted from the user-supplied terms; this step may be similar to step 1204 of process 1200 described above. At step 1306, a search is executed using a query made up of the user keywords, generating a list of hits. Unlike process 1200, keywords based on the context vector are not used to supplement the user keywords in the search query. As described for process 1200 above, search execution may be implemented using conventional techniques.

At step 1308, context keywords are extracted from the context vector; this step may be similar to step 1206 of process 1200 described above. At step 1310, the hits are ranked using the context keywords; in some embodiments, the user keywords may also be used for ranking The ranking algorithms may be generally similar to those used in step 1210 of process 1200. At step 1312, the results are returned to the user, similarly to step 1212 of process 1200. As in process 1200, the user's query and the context keywords may be presented using an interactive form via which the user can modify her query or the context keywords (or both) and submit the modified contextual query to search server 160.

It should be noted that processes 1200 and 1300 may result in lists of hits that differ as to content and/or order of the hits. Other variations in these processes are also possible. For instance some terms from the context vector may be used as context keywords in the search query while other terms are used only for ranking the hits. In another variation, only context keywords might be used for the search while user keywords are used only for ranking the search hits.

In some embodiments, the query and context vector can be used to perform multiple searches in parallel, and the final result can be obtained by aggregating page rankings across the searches. For example, a first search might use just the user keywords with the context vector having no effect; a second search might use the user keywords to identify hits and rank or score the hits using the context keywords (e.g., in accordance with process 1300 of FIG. 13); and a third search might use the user keywords and the context keywords together (e.g., in accordance with process 1200 of FIG. 12). In this embodiment, the hits are independently ranked or scored for each search; then an aggregate rank or score for each hit is computed, e.g., by conventional techniques such as averaging the ranks or scores across the multiple searches or selecting a median rank or score for the hit. If a hit does not occur in the results for one or more of the searches, it may arbitrarily be assigned a rank or score (e.g., a low rank or score), or the aggregate rank or score for the hit might be computed using only searches that produced that hit. The list of results presented to the user in this embodiment is advantageously based on the aggregate ranks or scores of the hits.

In any event, it should be understood that page rankings based on the user keywords and/or context keywords may be further modified based on other page ranking algorithms using various metadata for the query. Examples include the use of user profile data (if the user's identity is known) for search personalization, as well as various heuristics for resolving ambiguous terms, inferring local intent, etc. In addition to the list of hits, the search results page may also include sponsored results or other content as determined by the search provider.

IV. Contextual Search Interfaces with Augmented Content

As described above, a contextual search interface advantageously includes active and inactive states. In the inactive state, a small icon may be displayed (e.g., as shown in FIG. 5); this can reduce visual clutter on the page while still informing the user that a contextual search option is available. In the active state, a query form and submit control are displayed (e.g., as shown in FIG. 3).

In some embodiments, when the contextual search interface is active, the query form may be augmented with additional content (referred to herein as "special content") that may be of interest to the user. In general, when a user chooses to activate an inactive contextual search icon, it can be inferred that the user is likely to be interested in content related to that context. The content augmentation feature allows such content (or links to such content) to be presented as part of an active contextual search interface and not presented (or hidden) for inactive contextual search interfaces. Special content can be selected dynamically based on the context vector of the contextual search interface that is being activated.

In one embodiment, the augmented content includes shopping-related content (referred to herein as "Shop in Context"), in which opportunities to buy products related to the content are offered to the user. For example, Web page 600 of FIG. 6, described above, includes summaries of different news stories 602, 604, 606, each with its own contextual search icon 612, 614, 616. A user may activate one of these icons, e.g., icon 612, by clicking on it, thereby causing an active contextual search interface to be displayed and "Shop in Context" content to be added to the displayed page.

FIG. 14 shows a portion of Web page 600 after contextual search icon 612 has been activated. Icon 612 has been expanded to an augmented contextual search interface 1402, which includes a search box 1404 and a submit control 1406 (labeled "Search" in this example) that operate similarly to previously described contextual search interfaces. Augmented contextual search interface 1402 also includes "Shop in Context" content 1408, which in this case provides links and text identifying sites where one can buy merchandise related to the subject of news story 602 (specifically, to the musician Bono).

The "Shop in Context" content for a contextual search interface is advantageously selected based on the context vector, so that activating a different contextual search interface on the same page will generally produce different "Shop in Context" content. For example, FIG. 14 also includes a contextual search interface 1412 associated with news story 604; interface 1412 would appear when contextual search icon 616 of FIG. 6 is activated. Contextual search interface 1412 includes a text field 1414 and a submit button 1416, as well as "Shop in Context" content 1416. Because story 604 relates to a different subject from story 602, "Shop in Context" content 1416 (which relates to Venus Williams) is different from content 1408.

In some embodiments, special content such as "Shop in Context" content is generated dynamically by sending a content request from client application 125 (FIG. 2) to content augmentation server 180 when a contextual search interface is activated by a user. This content request includes the context vector, which content augmentation server 180 uses to select appropriate special content. Content augmentation server 180 may be operated by a search provider or by another promulgator of contextual search technologies.

Figure 15:
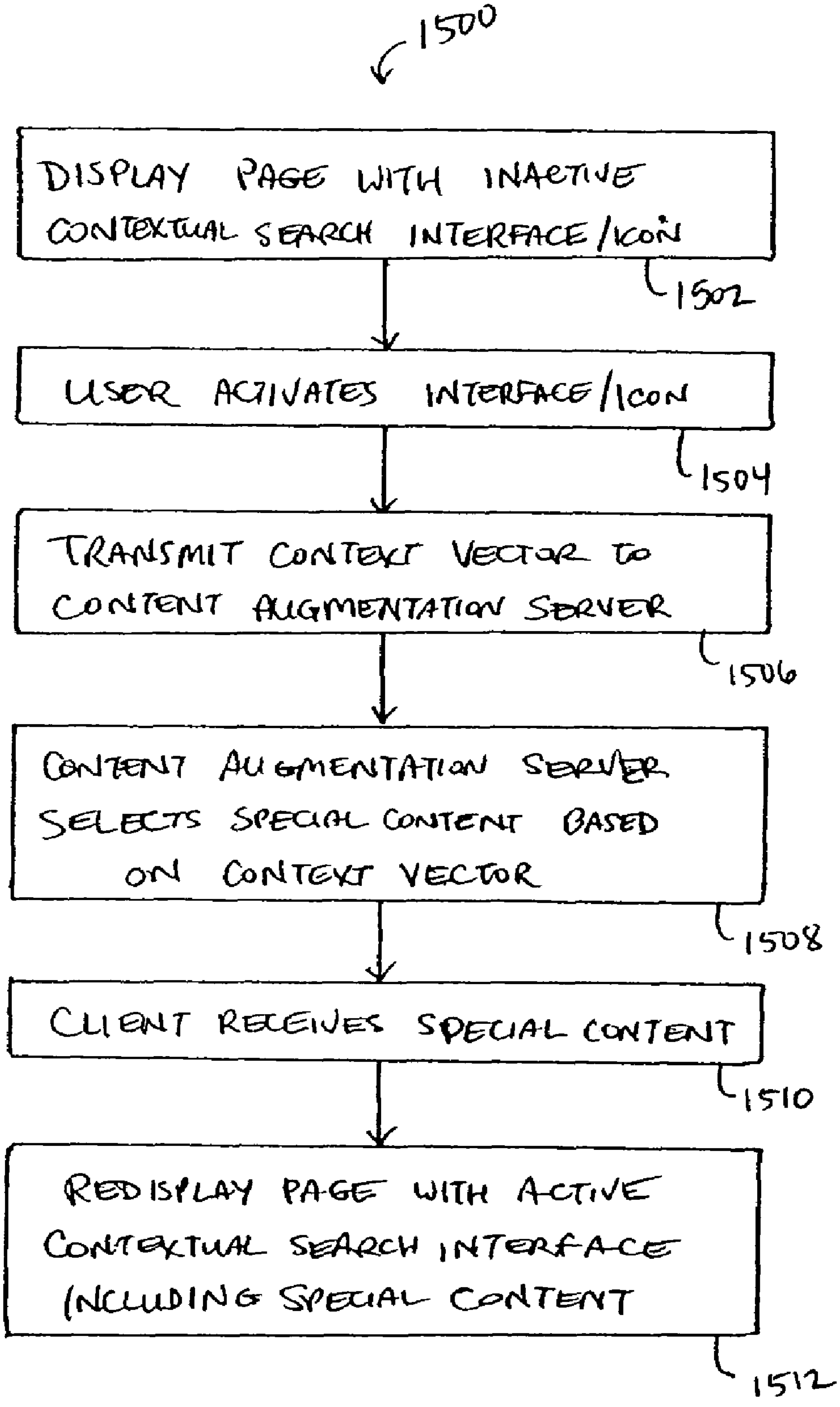
FIG. 15 is a flow diagram of a process for selecting augmented content according to an embodiment of the present invention.

FIG. 15 is a flow diagram of a process 1500 for generating an augmented contextual search interface that includes special content (e.g., "Shop in Context" content). At step 1502, a hosting page, such as page 600 of FIG. 6, is displayed in the user's browser. As described above, the hosting page includes one or more contextual search interfaces, each in the inactive (icon) state. At step 1504, the user activates one of these interfaces, e.g., by clicking on it. At step 1506, a content request that includes the context vector for the newly activated interface is transmitted to content augmentation server 180.

At step 1508, content augmentation server 180 generates or selects content to be added to the hosting page based on the context vector. For example, content augmentation server 180 may access sponsored content database 162 (shown in FIG. 2), which advantageously associates specific items of sponsored content with various keywords. Content augmentation server 180 can extract keywords from the received context vector and select one or more items of sponsored content from database 162 based on the keywords. The number of items selected may be limited if desired (e.g., in FIG. 14, two items are selected for each contextual search interface). Where more than the maximum number of items match the keywords, selection among the items can be based on various criteria, e.g., the number or importance of the keywords matched by each item and/or the terms of sponsorship agreements between a provider of content augmentation server 180 and various sponsors of the content in database 162.

At step 1510, content augmentation server 180 returns the special content to client application 125, which redisplays the host page (step 1512) including the special content. Any hosting page content following the insertion point of the contextual search interface may be moved down as needed to make room for the special content.

It will be appreciated that the process described herein is illustrative and that variations and modifications are possible. Steps described as sequential may be executed in parallel, order of steps may be varied, and steps may be modified or combined. In some embodiments, the special content may be selected in advance, e.g., when the contextual search interface is created or updated, and incorporated into the source code for the hosting page so that a real-time request to a content augmentation server is not required. It is to be understood that where a hosting page includes multiple contextual search interfaces, special content can be displayed for any active interfaces without also being displayed for any inactive ones.

Special content is not limited to shopping or advertising information. Other types of special content might include links to news stories related to the content, links to the most popular Web sites related to the content, related images or media content, or any other type of content. any type of special content can be selected based on the context vector, e.g., by accessing an appropriate database using the context vector. For instance, links to related news stories might be generated by querying one or more news servers or news sites using selected terms (or all terms) from the context vector. A list of the most popular related sites can be generated, e.g., by obtaining a listing of most popular sites and identifying sites from that list that contain terms from the context vector. Related images can be located by accessing an image database.

More generally, the context vector associated with a contextual search interface can be used in a variety of ways to identify related content. Using the content augmentation systems and methods described herein, displaying of such content can be deferred until the user has indicated interest in such content by activating a contextual search interface. Thus, the amount of information related to a particular topic that is displayed on the hosting page can be made dependent on the user's expressed interest in the topic.

In some embodiments, context vectors may be used to implement a contextual search without an explicit user-supplied query, also referred to herein as a "queryless" search. For instance, from an active contextual search interface (e.g., interface 304 of FIG. 3), a user may simply activate the "submit" control without entering any query terms. If a contextual search with no user query terms is submitted, the search server (or the client application) may construct and process a query based on the context vector or on selected terms from the context vector. For instance, one or more of the most frequent terms in the context vector might be selected in lieu of "user" keywords, while other terms might be used as context keywords, and a process such as process 1200 (FIG. 12) or 1300 (FIG. 13) described above may be used to perform the contextual search.

V. Further Examples of User Interfaces

The user interfaces shown and described above are illustrative, and other interfaces are possible. In some embodiments, the user interface provides additional features, such as previews of contextual searches and/or options for enabling the user to interact with the context vector. Additional examples of user interfaces will now be described.

A. Pop-Up Interface

Figure 16A:
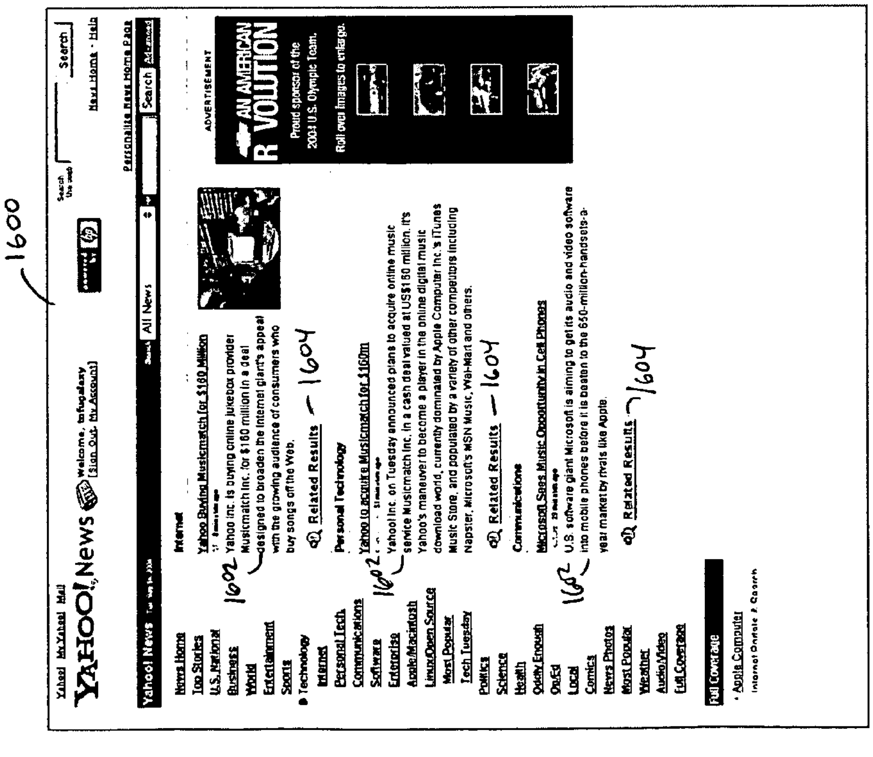
FIGS. 16A-16B are illustrations of a user interface for contextual search using a pop-up menu according to an embodiment of the present invention.
Figure 16B:
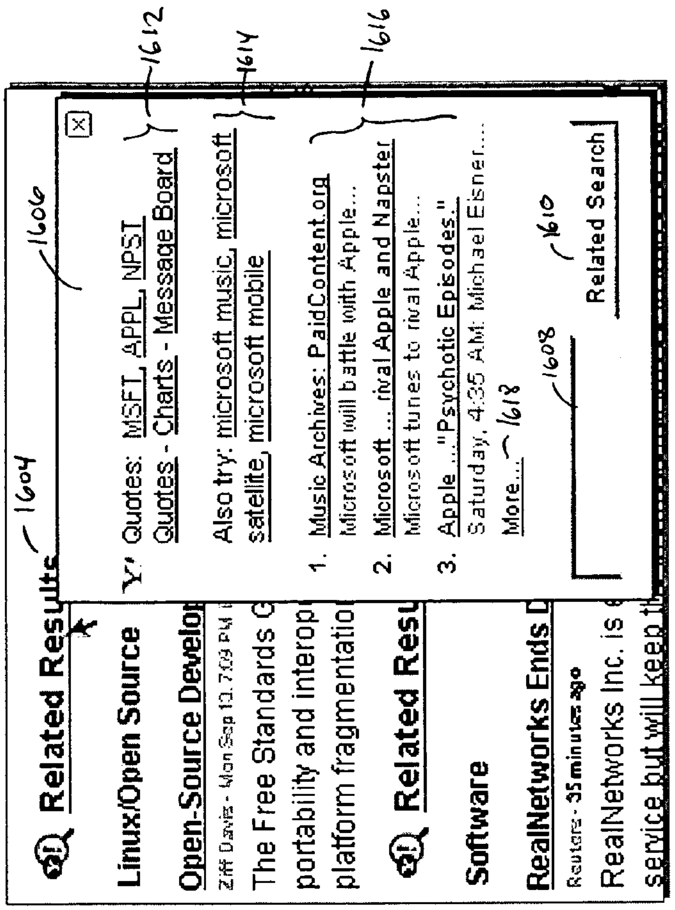

FIGS. 16A-16B illustrate a Web page 1600 with a contextual search interface that uses a "pop-up menu," i.e., an interface element that can be displayed or hidden in response to user commands. Such elements may be implemented as windows, dialog boxes, or any other displayable elements. In this example, Web page 1600 includes a number of short news reports 1602. Each news report 1602 is accompanied by a contextual search interface 1604 that initially appears in its inactive state. A context vector (not shown in FIG. 16) is defined for each contextual search interface 1604; in this embodiment, the context vector may be defined from the short report 1602 that appears on page 1600 or from a longer news story (not shown) to which the short report links. A process such as process 900 of FIG. 9, described above, may be used to create the context vectors.

When the user clicks on or otherwise activates interface 1604, a pop-up menu 1606 appears, as show in FIG. 16B. In this embodiment, pop-up menu 1606 corresponds to the active state of contextual search interface 1604. Pop-up menu 1606 includes a text box 1608 and a "related search" button 1610 for that can be used to enter a query for a contextual search. If the user enters a query, the context vector associated with interface 1604 would be submitted along with the query.

Pop-up menu 1606 advantageously also provides augmented content based on the context vector. For example, section 1612 identifies other pages relevant to the context. In this example, the other pages are owned by the provider of page 1600 and provide stock-market data related to companies mentioned in short report 1602. Relevant pages are advantageously identified in a context-dependent way. For instance, if the context vector includes the name of a company, links to stock market data or other information about that company might be provided. If the context vector includes the name of a product, links to sites selling or reviewing the product might be provided.

Section 1614 suggests related searches that the user may want to try. Suggestions for related searches may be identified in a variety of ways. For example, the search provider (or other supplier of augmented content) may keep records of user queries and may be able to provide a list of the most frequent queries containing a particular term. Terms from the context vector can be matched to a such list of queries to identify some number (e.g., three, five or ten) of related queries. As another example, it is described in U.S. Patent Application Publication No. 20040199498 (published Oct. 7, 2004), assigned to the assignee of the present application, that a concept network may be constructed from a set of queries and that the concept network may be used to generate suggestions for related searches. Starting from terms in the context vector, suggestions may be obtained using a concept network in accordance with methods described in the referenced Publication. Other techniques for generating suggestions for related searches may also be used.

Section 1616 includes the top three (or some other number) "preview" results of a queryless search in which the context vector is used to define a query as described above. The results include links that advantageously open the linked-to page in a new browser window. A "More . . . " link 1618 invites the user to view the full list of results, e.g., in a new browser window that is opened if the user selects link 1618.

In one embodiment, the preview queryless search is conducted by selecting some number (e.g., three to five) of highest-weighted terms from the input context vector as search keywords and executing a conventional search, with the search selecting a limited number (e.g., 10, 20) of most relevant hits. For each of these hits, a context vector is generated (e.g., using any of the processes described above) and compared to the input context vector to generate a similarity score. A similarity score may be based on the number of terms in common, the fraction of terms in common, and/or similarity of term weights assigned to particular terms. If the similarity score exceeds an upper bound, the hit is rejected as being too duplicative of the current content; if the similarity score is below a lower bound, the hit is rejected as being irrelevant. Hits that are not rejected may be presented as the search results. Optionally, if not enough search results are obtained, a new query using fewer keywords or a different combination of keywords might be processed in a similar manner to locate further relevant hits.

It will be appreciated that the pop-up interface described herein is illustrative and that variations and modifications are possible. The pop-up interface may be implemented using a pop-up menu, a dialog box, a new browser window, or a new tab for browser clients that support multiple tabs for displaying different Web pages. The size and placement of the pop-up interface can be adjusted as desired. Alternatively, any or all of the information shown in pop-up menu 1606 could be presented in-line in page 1600 when the contextual search interface is activated.

In some embodiments, the content of pop-up interface 1606 may depend in part on whether the Web page is owned by the contextual search provider or not. For instance, in the case of contextual search interfaces for third-party pages, section 1612 might be omitted. In other embodiments, the Web page owner may be allowed to select types of augmented content for pop-up interface 1606.

B. Toolbar Interface

Figure 17:
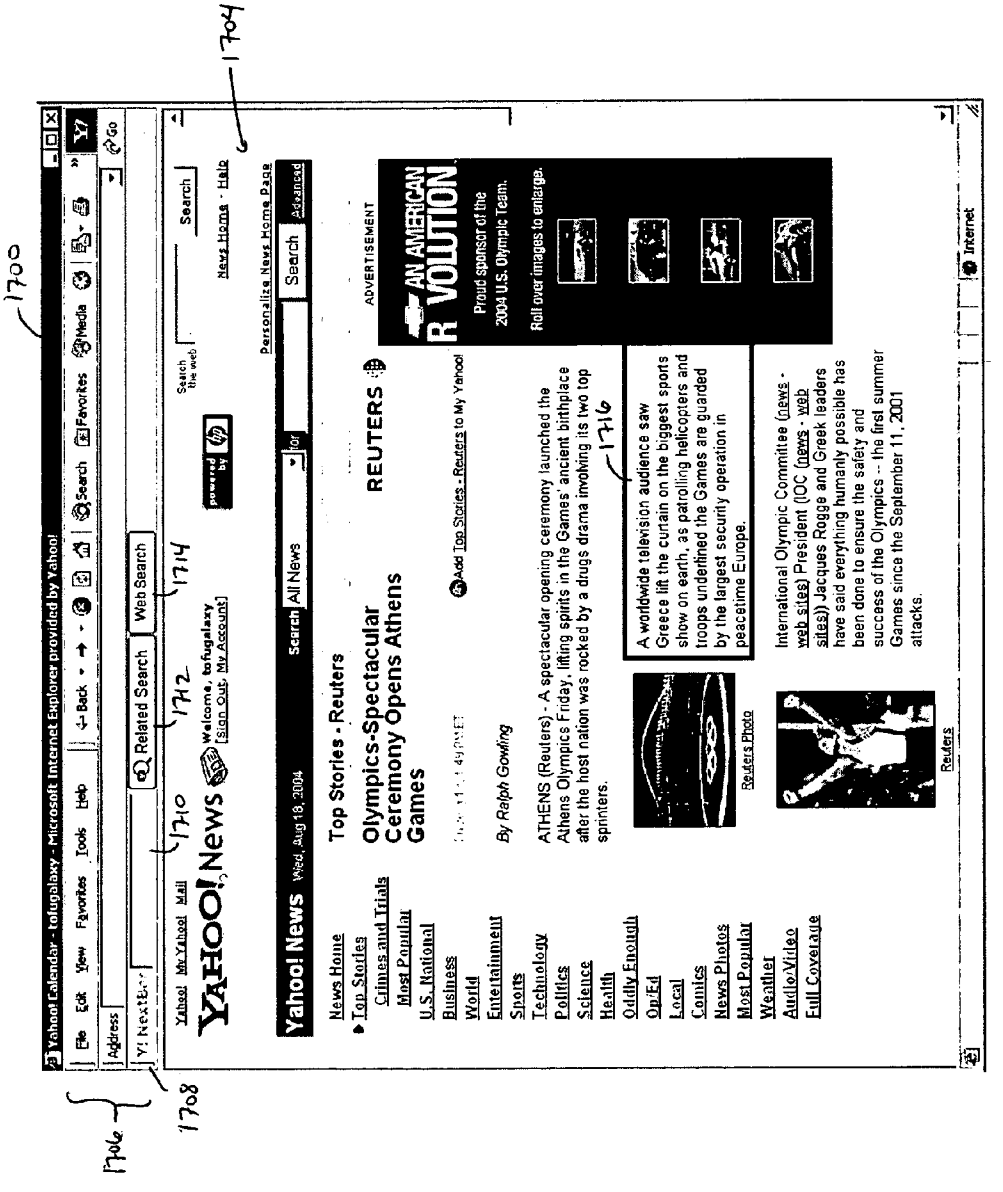
FIG. 17 is an illustration of a toolbar user interface for contextual search according to an embodiment of the present invention.

FIG. 17 illustrates a toolbar interface that enables a user to initiate a contextual search from any page. A browser window 1700 displays a Web page 1704. A control panel 1706 for browser window 1700 includes a search toolbar 1708. Toolbar 1708 includes a text box 1710, a "related search" button 1712, and a "Web search" button 1714. Like conventional search toolbars, search toolbar 1708 is generally active and appears in browser window 1700 regardless of which Web page 1704 is being displayed.

Toolbar 1708 provides a conventional search interface. For instance, the user can enter an arbitrary query into text box 1710 and activate "Web search" button 1714 to perform a non-contextual search. In general, the results of such a search would not depend on the Web page 1704 that was being displayed when the query was submitted.

In accordance with an embodiment of the present invention, toolbar 1708 also provides a contextual search interface for performing contextual searches with context derived from the current Web page 1704, which may be any Web page. To perform a contextual search, the user selects all or part of the text on page 1704 (e.g., block 1716), enters query terms into text box 1710, and activates "Related search" button 1712. The selected text is used to generate a context vector, e.g., as described above with reference to FIG. 10. In the present example, rather than modifying page 1704, the context vector is automatically used together with the query entered in text box 1710 to perform a contextual search. Results of the search are displayed either in window 1700 or in a separate window (not shown) that may be launched to display search results. For browsers that provide tabbed viewing of different pages, the results page may be displayed under a separate tab.

Toolbar 1708 advantageously supports a variety of contextual search techniques using a combination of explicit user input and default behavior. For example, if the user activates "Related search" button 1712 without entering a query into text box 1710, the default behavior may be to execute a queryless search (as described above) using the context vector generated from the selected text. As another example, if the user enters a query into text box 1710 and activates "Related search" button 1712 without selecting any portion of page 1704, the default behavior may be to use the complete text of page 1704 to generate the context vector for a contextual search. Combining these examples, if a user activates "Related search" button 1712 while viewing page 1704 without entering a query into text box 1710 or selecting any portion of page 1704, the default behavior may be to execute a queryless search using the complete text of page 1704 to generate a context vector.

Toolbar 1708 is illustrative, and variations and modifications are possible. Toolbar 1708 may include other buttons or control elements in addition to or instead of those shown herein.

Figure 18B:
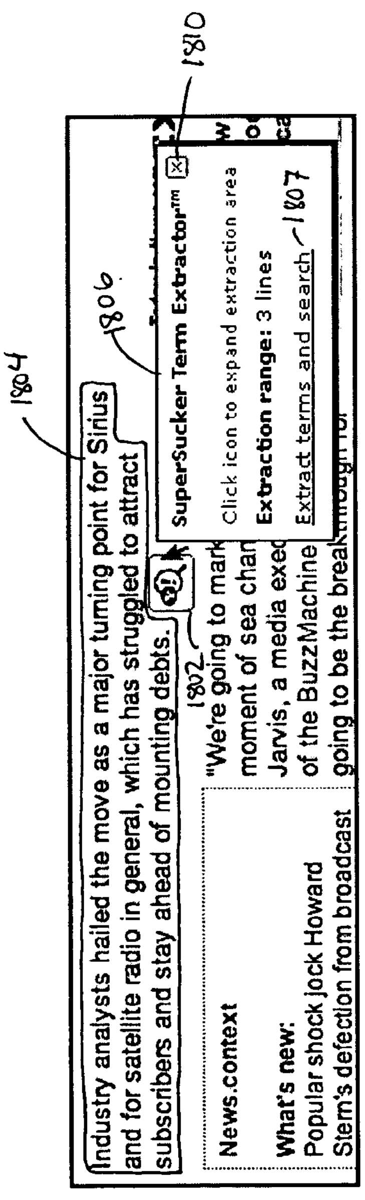
Figure 18C:
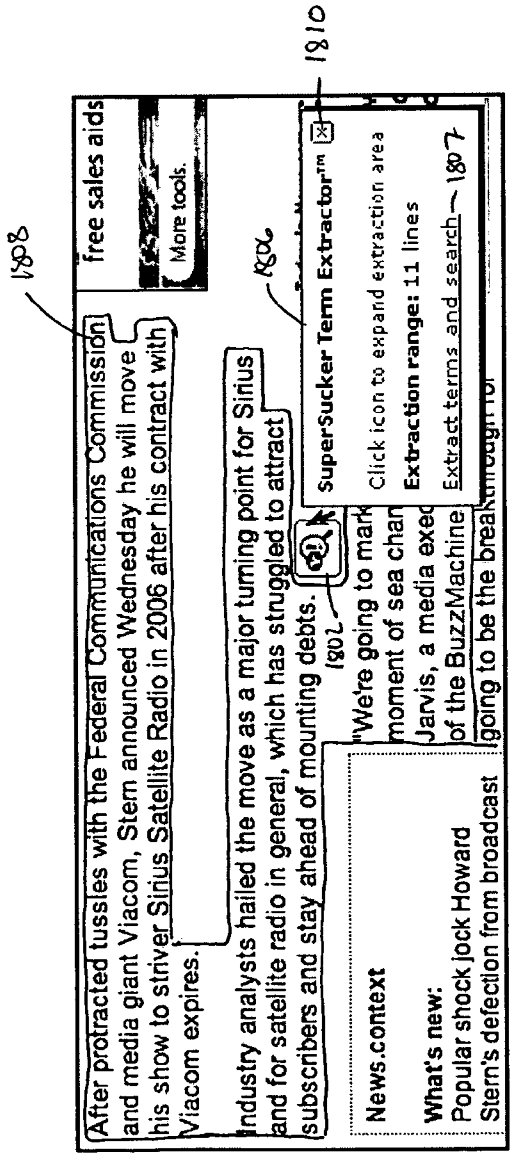

Various interfaces for selecting a portion of the current page may be implemented. For instance, a user may simply click and drag to select any portion of the text of the current page. FIGS. 18A-18C illustrate another example, referred to herein as a "term extractor." As shown in FIG. 18A, the term extractor initially appears as an anchor point (icon 1802) on a Web page 1800. In one embodiment, the position of icon 1802 is predefined as part of the content of page 1800. In another embodiment, icon 1802 may be placed on page 1800 by the user. For example, a suitable toolbar button or other interface element may be provided to enable the user create an anchor point. After activating this element, the user moves a pointing device (e.g. mouse) to place a pointer at a desired location within page 1800 and operates a selection control (e.g., a mouse button) when the pointer is at the desired position. Icon 1802 appears at approximately that position.

After icon 1802 has appeared, the user may click on icon 1802 to begin selecting content. As shown in FIG. 18B, when the user clicks on icon 1802, a relatively small portion 1804 of the surrounding text is selected. A pop-up menu 1806 also appears, inviting the user to initiate a search using the selected text (link 1807) or to further expand the range of the selected text by clicking icon 1802 again. If the user clicks icon 1802 again, as shown in FIG. 18C, a larger portion 1808 of the surrounding text is selected. Pop-up menu 1806 remains. If the user decides against executing a search, pop-up menu 1806 can be closed using control 1810.

Expansion of the selected text portion advantageously occurs with each click on extractor icon 1802. In one embodiment, the number of lines selected is incremented in fixed amounts; for example, three lines per click. In another embodiment, the selection is based on semantic units, such as sentences or paragraphs. For instance, clicking once on icon 1802 may select the sentence (or paragraph) where the extractor icon appears, clicking twice may add the preceding and following sentences (or paragraphs) to the selection, and so on. In one embodiment, repeated clicking can eventually result in selection of the entire page.

Figure 19:
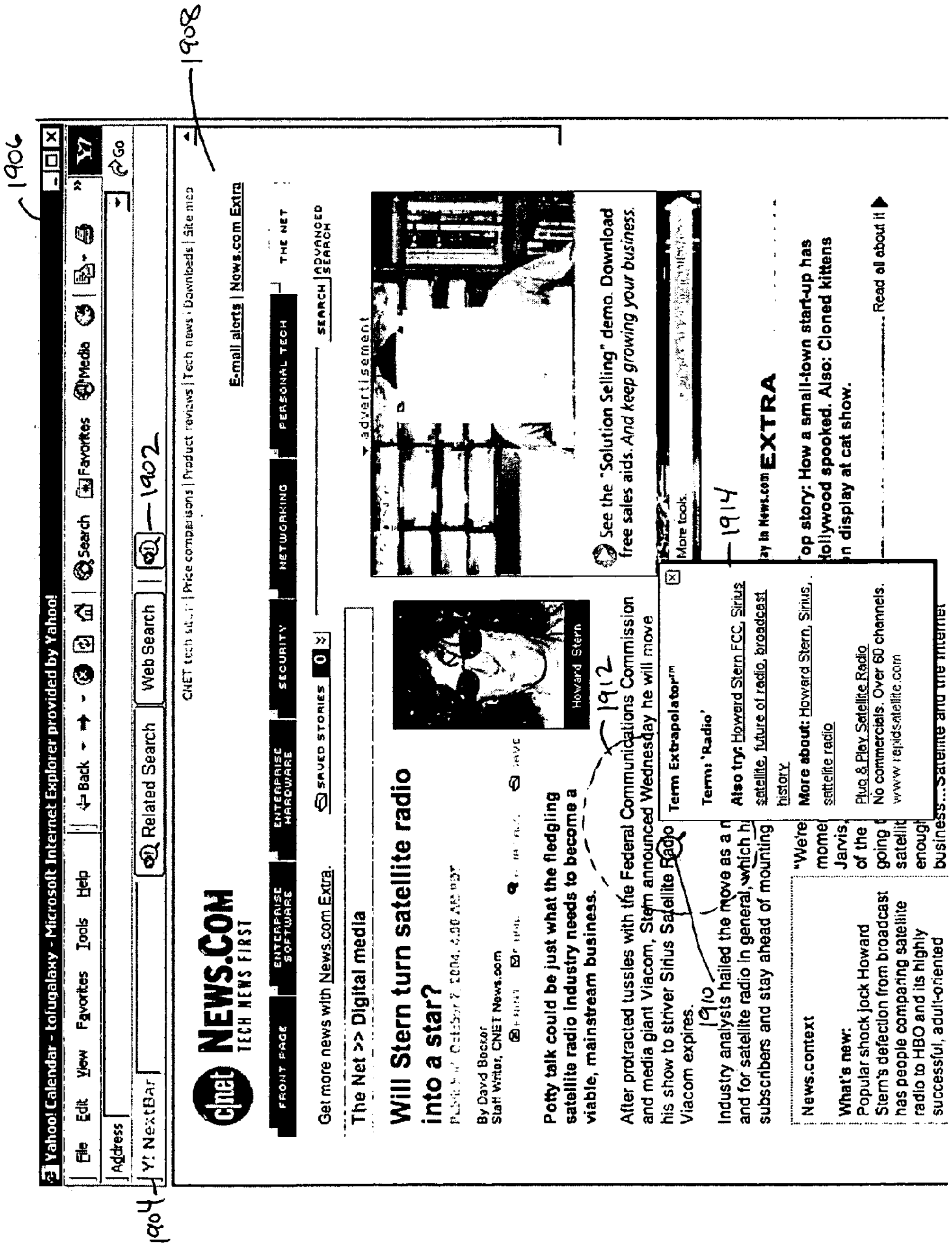
FIG. 19 is an illustration of another text selection tool for a contextual search according to an embodiment of the present invention.

Another example of a text selection tool, referred to herein as a "term extrapolator," is shown in FIG. 19. The term extrapolator may be based on a geometrically-oriented text selection toll as described in above-referenced co-pending application Ser. No. 11/033,101. In FIG. 19, the term extrapolator tool is invoked by the user activating a suitable button 1902 on a toolbar 1904 of a browser window 1906. The user then clicks on a desired location (e.g., a word of interest) in a page 1908 that is being displayed in browser window 1906. For example, the user may click on the word "Radio" at 1910. An approximately circular region 1912 around the selected word is highlighted and used to derive context. A pop-up menu 1914 also appears, offering various choices to the user, such as related searches, sponsored content, and the like.

The content of pop-up menu 1914 is advantageously generated from a context vector that is determined using the text contained in circular region 1912, e.g., in accordance with techniques described above. For instance, in the embodiment shown, pop-up menu 1914 includes suggestions for related searches, links to other pages with information about people and companies appearing in the context vector, and sponsored content related to the subject of the article. Other information or combinations of information may also be supplied in pop-up menu 1914.

The user may click again to further expand region 1912, and pop-up menu 1914 is updated accordingly. With this real-time feedback, the user can stop the expansion whenever pop-up menu 1914 reflects the actual context of interest. It is to be understood that region 1912 is not limited to being circular. Ellipses, ovals, polygons or other shapes may be substituted.

These selection techniques can be combined. For instance, referring again to FIGS. 18B and 18C, the pop-up menu 1806 for the term extractor could also include information similar to that shown in pop-up menu 1914. Text selection mechanisms can also include conventional click-and-drag techniques or other techniques. The term extrapolator and term extractor shown herein may be advantageously employed for browsers implemented in mobile devices, where click-and-drag techniques are not readily available.

The toolbar interfaces described herein can be further extended to a "deskbar" interface. The deskbar interface may be available, e.g., from a Windows desktop, at any time when the user's computer is connected to a network (e.g., the Internet) regardless of whether the user is actively accessing network content at that time. The deskbar interface can advantageously be used to initiate a contextual search using any document the user happens to be viewing. As described above, the user activates the deskbar interface, selects text from any application (e.g., word processing, e-mail, etc.), enters a query into the deskbar interface, and activates a "submit search" control of the deskbar interface. The contextual search can be processed as described above; the deskbar interface advantageously opens a browser window to display the results.

Any of the toolbar-based techniques described above, including context selection, selecting the full document by default, and queryless search capability may be incorporated into the deskbar interface.

C. User Interaction with Context Vector

In some embodiments, the user may be able to customize an automatically generated context vector, e.g., while viewing results of a contextual search. For example, referring again to FIG. 17, suppose that a user selects text 1716, types "athens olympics" into text box 1710, then activates "Related search" button 1712 to perform a contextual search.

A search results page 2000 that might be generated in response to this contextual query is shown in FIG. 20. Page 2000 includes conventional features of a results page, such as a list of hits at 2002, a text box 2004 for editing the query, and a "Search" button 2006 for submitting the new query.

Page 2000 also includes a context box 2008 that can be edited by the user. Context box 2008 identifies, at 2010, the Web page (e.g., page 1704 of FIG. 17) that provided the context vector and provides a list of context vector terms 2012 that were used in the query (e.g., "2004 games," "olympics," "greece," etc.). Each term 2012 has an associated checkbox 2014 that the user can check or uncheck to change the context. After changing the selection of checked boxes and/or editing the query as desired, the user can execute a new contextual query by activating "Search" button 2006. Only terms that are checked in box 2008 would be used in the context vector for the new search.

In this embodiment, context box 2008 includes a control 2016 that allows the user to "turn off" the context vector and execute a non-contextual search.

Context box 2008 can be used to support an iterative search process. For example, if the list of hits at 2002 is not satisfactory, the user can change the context vector and/or the query and search again. The search results would be displayed on a page similar to page 2000, showing which checkboxes 2010 were checked or not and allowing the user to make further changes to the context vector and/or the query. In this way, the user can iteratively refocus the search to locate relevant content. For instance, the user could begin with a queryless contextual search executed from some page containing information of interest, then begin adding keywords and/or modifying the context terms to refine the search. The user might also turn off the context vector using control 2016 or select one of the hits 2002 as a content source for a new contextual search, e.g., by clicking through to one of the hits 2002 and executing a contextual search from a toolbar interface while viewing the hit page.

In some embodiments, different context terms can be given different weights in ranking search results. The user may be allowed (e.g., via an "advanced search" option) to modify the weights, in addition to or instead of using checkboxes 2014.

D. Free Text Queries

Figure 21:
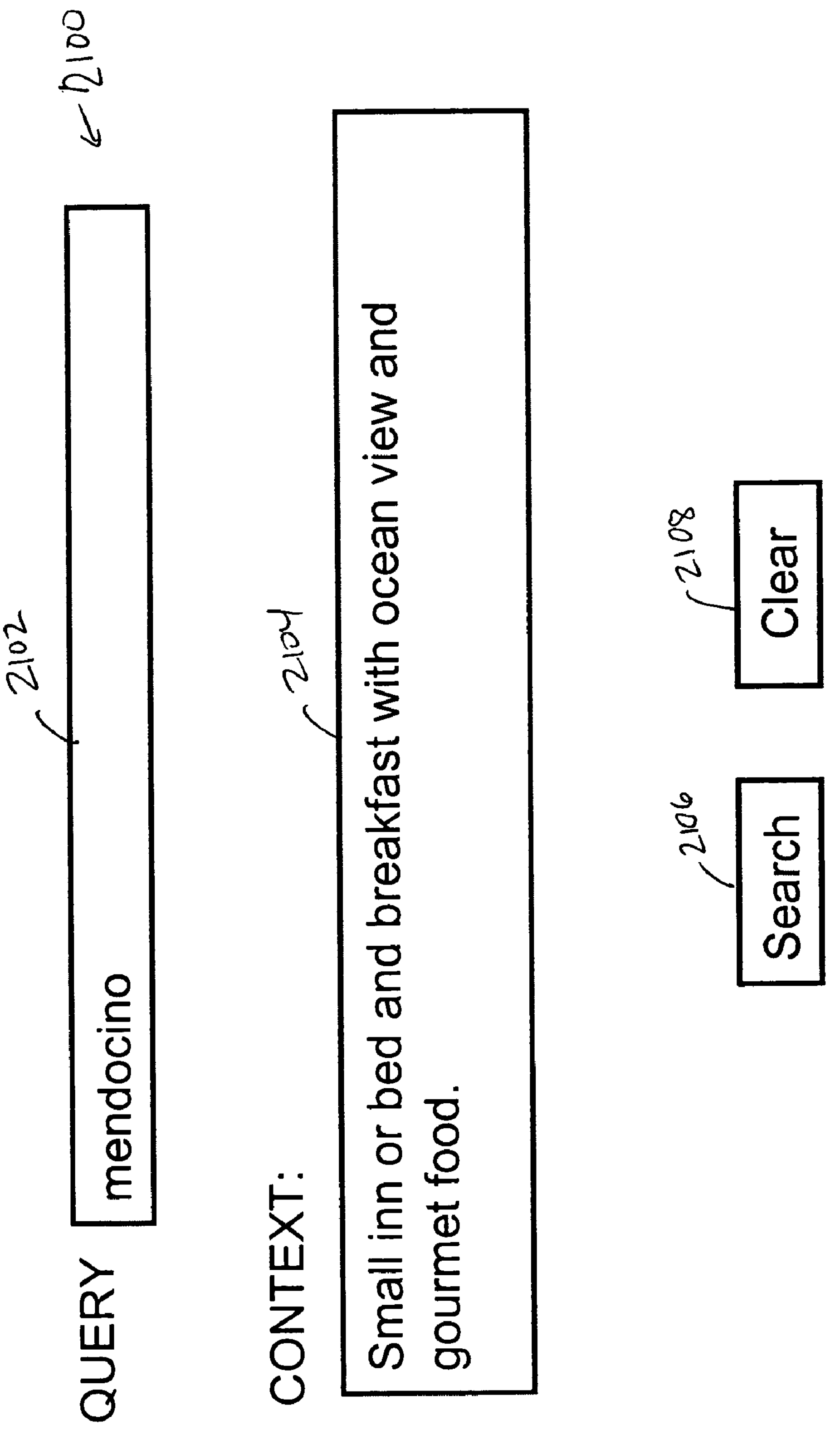
FIG. 21 is an illustration of a user interface for a contextual search based on user-created content according to an embodiment of the present invention.

Another user interface for contextual queries allows the user to provide an arbitrary block of text as a query. For example, a search page may have a large box into which the user can freely type (or cut and paste) text describing what the user is interested in. FIG. 21 illustrates one such interface 2100. Query box 2102 is used to enter keywords (e.g., "mendocino") that must be present in the results. In context box 2104, the user can enter a free-text description of terms that provide context for identifying which hits are most likely to be relevant. Sentences, phrases, or single words may be provided. "Search" button 2106 submits the query, and "Clear" button 2108 clears boxes 2102 and 2104. In some embodiments, query box 2102 or context box 2104 may be left blank by the user. If "Search" button 2106 is activated while query box 2102 is empty, a queryless contextual search using context information from box 2104 may be executed; similarly, if search button 2106 is activated when context box 2104 is empty, a conventional non-contextual search may be executed. If both boxes 2102, 2104 are empty when "Search" button 2106 is activated, no search would be executed. The user might be prompted to enter something in one or both boxes and try again.

Interface 2100 allows users to indicate their interests in a more natural way than conventional search queries permit. A user can insert any amount of descriptive material into context box 2104, and the search server can use that material to shape a response to the query as described above. Since context terms need not be used as search keywords, the user can freely enter words, phrases, and/or sentences describing the content sought, without trying to exactly match terms that the content provider might or might not have used.

It will be appreciated that all of the foregoing user interfaces are illustrative and that other interfaces are also possible. Interface elements described herein may be modified or varied in appearance and/or operation.

In some embodiments, user interfaces similar to those described herein may be provided for handheld devices (e.g., mobile phones or personal digital assistants). Such devices typically provide limited or comparatively slow interfaces for user data entry. For instance, a mobile phone keypad typically has digits 0-9, pound (#), and star (*) keys, as well as a small number of menu/command keys. Typing text often requires relatively slow processes such as pressing a key multiple times to cycle through three or four letters associated with that key. Other handheld devices provide keyboards or handwriting recognition, but the small size of keyboards and the limitations of handwriting recognition can slow the process of entering text for a search query.

User interfaces that allow queryless searching are well-suited for such devices. For example, in one embodiment, while the user is viewing a page, one of the input keys may be designated for initiating a queryless search using the entire page as context, similarly to the effect of selecting "Related search" button 1712 (FIG. 17) without selecting text or entering a query as described above. Alternatively, the user may be able to select text and execute a queryless search on the selected text. In some embodiments, interfaces similar to the term extractor or term extrapolator described above might be used to facilitate text selection, e.g., in devices that lack "click and drag" selection functions.

VI. Further Embodiments

Contextual search capability and context vectors have a variety of other embodiments and applications. Some examples will now be described; it is to be understood that these examples are illustrative and not limiting of the invention.

In some embodiments, context vectors can be also be used to facilitate entry of queries by users. For example, if a user begins to enter (e.g., by typing) a query into a search toolbar interface of a client application while viewing a hosting Web page, the client application might use context vector(s) from that page to generate auto completion suggestions for the query. This can be done regardless of whether a particular contextual search interface is active or inactive. For example, if at page 600 of FIG. 6, the user typed "V-E-N" into a search toolbar interface (not shown in FIG. 6), the client application might suggest "Venus" or "Venus Williams" as the intended text. The user could then hit the Enter or Tab key (or any other designated key) to accept the suggestion or just ignore the suggestion and keep typing. Similarly, if the user begins to type a query into a contextual search interface, the context vector for that interface may be used to generate auto completion suggestions for the user.

In some embodiments, the search server may collect data related to contextual searches and use this data to improve the results of such searches. Data may be collected, e.g., per context vector or per hosting page. The data may include log files containing queries that were received with a particular context vector or from a particular hosting page, clickthrough statistics indicating which hits users who entered the logged queries actually investigated, explicit user ratings of hit pages, and the like. This data may be used in various ways to improve the results of contextual searches. For example, when a query comes from a particular contextual search interface, the search server might include with the search results one or more suggestions for related queries that the user might want to explore next. The related queries can be determined, e.g., based on other queries that have frequently been received with the same context vector or from the same hosting page.

As another example, clickthrough data and/or explicit ratings data associated with hits resulting from searches using a given context vector or contextual search interface may be used to refine the scoring or ranking of search hits during processing of subsequent queries that include the same context vector or that originate from the same contextual search interface. For example, hit pages or sites that have been frequently visited or highly rated by previous users having a particular context (as represented by the context vector) are relatively likely to be useful to subsequent users having the same context; such hits may have their scores or rankings adjusted upward so that they receive more prominent placement. Conversely, hits that have been generally ignored or that have received low user ratings within a particular context are less likely to be relevant and may have their scores or rankings adjusted downward.

In addition, aggregated data about queries and/or clickthroughs originating from a particular contextual search interface may be shared with the content provider responsible for the contextual search interface, preferably without identifying individual users. The content provider can use such data to gain insight into the interests and behavior of users who visit the site, which may help the content provider to improve the usefulness and popularity of the site.

Query and/or clickthrough data may also be used for content augmentation. For instance, when a user activates a contextual search interface, the special content may include a list of the most frequent queries submitted via that interface or the sites most frequently visited by previous users of that interface. These queries or sites may be presented using active links so that the user can execute one of the queries or visit a site by clicking the link.

In some embodiments, a search server (or another server) may collect data about existing contextual search interfaces and define relationships between them based on their respective context vectors. For example, a "similarity" relationship might be defined between two interfaces that have a certain fraction of context vector terms in common; a "refinement" relationship might be defined where one interface's context vector includes all of the terms of another interface's context vector plus at least one additional term. In this manner, a graph with contextual search interfaces as nodes and the relationships as edges may be defined. A representation of the graph may be used during query processing. For instance, suppose that a contextual search interface A is a refinement of a contextual search interface B. When a query is submitted via interface B, terms from the context vector of interface A might be used in processing the query. Other relationships, including indirect relationships (e.g., if A is a refinement of B and B is a refinement of C, then it can be inferred that A is a refinement of C), may also be defined and used in query processing.

In still other embodiments, a contextual search query can be submitted to any search server, and different contextual searches can be submitted to search servers controlled by different entities, e.g., by configuring the contextual search interface so that the URL for submitting queries directs them to the desired search server. For instance, if a contextual search interface relating to automobiles is created and if a specialized server (with search capability) for automobile information is available on the Web, the contextual search may be routed to that server by including an Internet address of that server in the URL. In this way, contextual searches can provide users with access to search servers that are especially suited to their contexts, without the users having to know in advance that such a server exists. The ability to automatically direct a query to an appropriate server in a context-dependent manner may further enhance the appeal of contextual searches to users.

Selective routing of contextual queries may be implemented in various ways. For instance, where contextual search interfaces are created by content developers, the content developer may construct a query URL directed to the address of any server on the Web and may enhance the query URL with a query appropriately formatted for the targeted server. Such enhanced URLs advantageously include contextual terms (e.g., a context vector) as well as user-supplied terms.

Similarly, where contextual search interfaces are generated automatically, a software module that generates such interfaces may be configured to select an appropriate search server and format for the query URL based on the context vector. It is to be understood that the selected search server need not have any organizational connection to a creator or promulgator of the interface-generating software module, provided that the software module is capable of generating code that will cause a request to be transmitted to the selected search server in a format that the selected search server is capable of processing.

Where the search query is to be directed to a specialized search server, the active state of the contextual search interface may include special content as described above. This special content may be provided by the specialized search server or by a content augmentation server that may be controlled by a different entity. The special content may include information about the search server to which the search will be directed, such as a link to the search server's Web site.

In yet another implementation, the decision as to where to direct a contextual search query might be made at query execution time. For example, all contextual search queries could be directed to a search server (e.g., search server 160 of FIG. 2), and the search server could determine, based on a combination of the user query and context vector information, whether to redirect the query to a different server for processing. In this implementation, the decision to redirect a query might be dependent in part on the user-supplied element of the query. For instance, suppose the content for a contextual search interface relates to a new album. If a user enters the query "review" via the contextual search interface, that query could be redirected to a database of music reviews, while if the user enters the query "buy" via the same interface, that query might be processed by the search server without redirecting.

In some embodiments, different contextual search queries may be directed to the same search server but limited to different portions of a search corpus. For example, a search provider may divide Web pages into a number of potentially overlapping "properties," such as a "news" property, a "shopping" property, a "sports" property and so on. Each such property can be treated as a separate search corpus, and based on the query and the context vector, a search may be directed to any one or more of these properties. Where searches across multiple properties are performed, the property that returned a particular result may also be used as a factor in ranking the results.

Other embodiments include user personalization features allowing data specific to the user as well as the context to inform the search results. For example, the search provider may maintain a user profile for each registered user of its services. When a registered user who is logged in executes a search (contextual or otherwise), information about that search can be recorded and associated with the user. By analyzing patterns in a given user's queries, a "user vector" may be developed. During a contextual search, information from the user vector as well as the context vector may be used in performing the search and/or ranking the results. In addition, the user vector may also be used in dynamically generating augmented content when a user activates a contextual search interface as described above. Where the user who entered a query is identifiable, any user-specific information (e.g., sites or pages a user has bookmarked, explicit user ratings of sites or pages, and so on) may also be used in conjunction with a context vector to inform search results.

In even further embodiments, users may be able to create bookmarks for contextual search interfaces (or specific contextual queries) that they have found useful so that they can easily return to these interfaces. It will be appreciated that because contextual search interfaces return context-dependent results, not all such interfaces are likely to be equally useful to a particular user. When a user finds one that is useful, she may bookmark the page that contains it using conventional browser-based bookmarks or bookmarking functionality supported by a search toolbar; however, it will be appreciated that if the content of the hosting page changes, the context vector may change as well. Accordingly, some embodiments of the present invention enable the user to bookmark the contextual search itself, e.g., by saving the enhanced query URL that includes the context vector. When the user selects this bookmark, she is prompted to enter a query, and a contextual search is executed, using the new query. Alternatively, the user may be able to save the query as part of the bookmark so that selecting the bookmark at some later time re-executes a particular contextual search regardless of the current content of the hosting page.

Users may also be able to share their bookmarked contextual searches with other users, e.g., through various trust network mechanisms. In still other embodiments, users may be able to annotate and label their bookmarked (or otherwise saved) contextual searches or interfaces.

While the invention has been described with respect to specific embodiments, one skilled in the art will recognize that numerous modifications are possible. For instance, where specific input devices (e.g., computer mouse) are referred to herein, it is to be understood that different input devices (e.g., keystrokes or voice commands) can be substituted. Similarly, clickable buttons and other graphical user interface control elements referred to herein may be replaced by any suitable alternative control elements.

The appearance of the contextual search interface in active and/or inactive states may also vary from that shown herein. For instance, the active interface may appear in the hosting page as shown in FIG. 3 or in a separate pop-up menu as shown in FIG. 16. In addition, the look of the icon and/or the active interface elements may be varied without limitation. Such variation may be controlled by a contextual search promulgator or a content provider. As just one example, the look of the inactive icon may be varied to suggest the context; thus, a film reel might be included in an icon for entertainment-related searches, a football or baseball might be included in icons for sports-related searches, and so on. A consistent text string (e.g., "Search This" as shown in FIG. 6, "Related Results" as shown in FIG. 16), symbol, or other element may be included in all icons as a further indication that the icon represents a contextual search interface.

In another variation, the inactive state of a contextual search interface may be implemented with hidden and visible modes. For example, the contextual search icon may be hidden (i.e., not displayed on the hosting page) except when the user's mouse cursor is positioned or moved over the associated content. When the mouse cursor is so positioned, the icon becomes visible and the user may click on it to activate it. Hidden and visible modes may be implemented, e.g., using a language such as Java.

The embodiments described herein may make reference to Web sites pages, links, and other terminology specific to instances where the World Wide Web (or a subset thereof) serves as the search corpus. It should be understood that the systems and processes described herein can be adapted for use with a different search corpus (such as an electronic database or document repository) and that results may include content as well as links or references to locations where content may be found.

In addition, the invention has been described with reference to computer systems having particular hardware and software elements. It is to be understood that other systems with different combinations of hardware and/or software components could also be implemented.

Thus, although the invention has been described with respect to specific embodiments, it will be appreciated that the invention is intended to cover all modifications and equivalents within the scope of the following claims.

What is claimed is:

1. A method for processing a query, the method comprising the computer-implemented steps of:

receiving, from a client, at a server, via a contextual search interface displayed on a content presentation application executing on the client, query data indicating a query initiated by a user of said client;

receiving from said client, at said server, with said query data, a context vector associated with the contextual search interface, the context vector including context data derived from content displayed on the client by the content presentation application when the query data was entered by the user;

wherein the context vector includes one or more terms that are not part of the query data;

wherein the context vector is not identical to said content;

generating a first search result comprising a ranked list of hits using at least the query data, the context vector, and a plurality of hits obtained from searching a search corpus;

wherein the step of generating the first search result includes at least one of:

searching the search corpus based on search criteria that are based, at least in part, on the context vector; or ranking the plurality of hits based, at least in part, on the context vector;

transmitting the first search result for presentation to the user;

with said first search result, transmitting to the user a user-editable list of context terms from the context vector;

receiving, from the client, an updated context vector based on a user update to the user-editable list of context terms;

generating a second search result comprising a second ranked list of hits using at least the query data, the updated context vector, and a second plurality of hits obtained from searching a search corpus;

wherein the step of generating the second search result includes at least one of:

searching the search corpus based on search criteria that are based, at least in part, on the updated context vector; or ranking the plurality of hits based, at least in part, on the updated context vector; and transmitting the second search result for presentation to the user.

2. The method of claim 1, wherein the user-editable list includes each of a plurality of context terms derived from said content together with a respective toggle control, the toggle control being operable by the user to enable or disable use of the context term in the modified search.

3. A method for providing access to a search engine, the method comprising the computer-implemented steps of:

sending to a client a page of content comprising first code, wherein execution of said first code by a content presentation application at the client causes the client to perform the steps of:

displaying at least first particular content from said page, wherein said first particular content is a subset of the content in said page;

displaying one or more contextual search icons, each contextual search icon associated with a different portion of the content of the page, said contextual search icons including a particular contextual search icon associated with the first particular content;

receiving a user selection of the particular contextual search icon;

in response to the user selection, while continuing to display at least a portion of said page, displaying an expanded contextual search interface corresponding to the particular contextual search icon, the expanded contextual search interface including a query entry area configured to accept entry of zero or more query terms by the user and a search submission control element;

prior to the user submitting any query data, sending a context vector derived from the first particular content to a first server;

prior to the user submitting any query data, in response to sending the context vector to the first server, receiving from the first server, for display with said expanded contextual search interface, augmented content based at least in part on the context vector; and while continuing to display at least a portion of said page, prior to the user submitting any query data, displaying the augmented content in or adjacent to said expanded contextual search interface.

4. The method of claim 3, wherein the context vector contains one or more terms extracted from the first particular content.

5. The method of claim 3, wherein displaying the expanded contextual search interface includes displaying the query entry area as an element of the page.

6. The method of claim 3, wherein displaying the expanded contextual search interface includes displaying a pop-up element containing the query entry area.

7. The method of claim 3, wherein the augmented content includes at least one of:

a suggestion for a related search, the suggestion having been selected at least in part on the context vector; or a link to a related page, the related page having been selected based at least in part on the context vector; or a search result for a search query generated based at least in part on the context vector.

8. A method for performing a search, the method comprising the computer-implemented steps of:

receiving, from a client, at a server, via a contextual search interface displayed on a content presentation application executing on the client, a user query that includes query data entered by the user in a first field of the contextual search interface;

receiving from said client, at said server, with said query data, context data entered by the user in a second field of the contextual search interface;

deriving a context vector from said context data, said context vector representing said context data and further being not identical to said context data;

generating a search result comprising a ranked list of hits using at least the query data, the context vector, and a plurality of hits obtained from searching a search corpus;

wherein the step of generating the search result includes at least one of:

searching the search corpus based on search criteria that are based, at least in part, on the context vector; or ranking the plurality of hits based, at least in part, on the context vector;

transmitting the search result for presentation to the user.

9. The method of claim 8, further comprising:

with said search result, transmitting to the user a user-editable list of context terms from the context vector.

10. The method of claim 9, further comprising:

receiving, from the client, an updated context vector based on a user update to the user-editable list of context terms;

generating a second search result comprising a second ranked list of hits using at least the query data, the updated context vector, and a second plurality of hits obtained from searching a search corpus;

wherein the step of generating the second search result includes at least one of:

searching the search corpus based on search criteria that are based, at least in part, on the updated context vector; or ranking the plurality of hits based, at least in part, on the updated context vector;

transmitting the second search result for presentation to the user.

11. A computer-readable storage medium that is volatile memory or non-volatile memory and that stores computer-executable code that, when executed by one or more processors at a client, causes the client to implement a graphical user interface, wherein the graphical user interface:

includes a selection control element activating the graphical user interface;

includes a query entry area configured to accept entry of one or more query terms by a user;

includes a submission control element configured to submit a query including any query terms entered in the query entry area and a separate context vector derived from at least a portion of content in a page currently displayed at the client to a search engine in response to user operation of the submission control element, and includes a pop-up element for displaying at least the query entry area and augmented content based on said context vector;

wherein the graphical user interface is configured to display the pop-up element in response to the user activating the user interface via the selection control element;

wherein the graphical user interface is configured to send said context vector to a first server upon the user activating the graphical user interface via the selection control element, prior to the user entering any query terms;

wherein the graphical user interface is configured to receive said augmented content from the first server, in response to sending the context vector, prior to the user entering any query terms.

12. The computer-readable storage medium of claim 11, wherein the at least a portion of content is selectable by the user.

13. The computer-readable storage medium of claim 12, wherein the selection control element includes a selection expander, the selection expander being configured such that initial operation of the selection expander selects a small portion of the content and repeated operation of the selection expander selects increasingly larger portions of the content.

14. The computer-readable storage medium of claim 13, wherein repeated operation of the selection expander increases the selected portion of the content in units corresponding to one or more sentences.

15. The computer-readable storage medium of claim 13, wherein repeated operation of the selection expander increases the selected portion of the content to correspond to a substantially circular region centered approximately on the initially selected small portion of the content.

16. The computer-readable storage medium of claim 12, wherein in the event that the user activates the submission control element without selecting the portion of the content, all of the content of the page is selected.

17. The computer-readable medium of claim 12, further comprising code which, when executed by one or more processors at the client, causes the client to, in response to the user selecting the at least a portion of content, generate the context vector to send to the first server.

18. The computer-readable storage medium of claim 11, wherein in the event that the user activates the submission control element without entering one or more query terms, the context vector is used to automatically generate one or more query terms for the search engine.

19. The computer-readable storage medium of claim 11, wherein the query entry area, the selection control element, and the submission control element are accessible while the user is viewing any page.

20. The computer-readable storage medium of claim 11, wherein the query entry area, the selection control element, and the submission control element are accessible while the user is viewing any page that is not distributed via a particular network.

21. The computer-readable medium of claim 11, wherein the augmented content includes at least one of:

a suggestion for a related search, the suggestion having been selected at least in part on the context vector; or a link to a related page, the related page having been selected based at least in part on the context vector; or a search result for a search query generated based at least in part on the context vector.

22. The computer-readable medium of claim 11, wherein the graphical user interface appears in-line in said page.

23. The computer-readable medium of claim 22, wherein the page initially displays an icon corresponding to the selection control element and wherein the query entry area and the submission control element are displayed in response to selection of the icon by the user.

24. The computer-readable medium of claim 23, wherein the at least a portion of content is a predetermined portion associated with the graphical user interface.

25. The computer-readable medium of claim 11, further comprising code which, when executed by one or more processors at the client, causes the client to implement multiple copies of said graphical user interface within said page, each of said copies being associated with a different portion of the content of said page.

* * * * *